(12) United States Patent
Matsugu et al.

(10) Patent No.: US 8,015,130 B2
(45) Date of Patent: Sep. 6, 2011

(54) INFORMATION PROCESSING APPARATUS, INFORMATION PROCESSING METHOD, PATTERN RECOGNITION APPARATUS, AND PATTERN RECOGNITION METHOD

(75) Inventors: Masakazu Matsugu, Chiba (JP); Katsuhiko Mori, Kawasaki (JP); Mie Ishii, Machida (JP); Yusuke Mitarai, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

(21) Appl. No.: 12/696,993

(22) Filed: Jan. 29, 2010

(65) Prior Publication Data

US 2010/0121798 A1 May 13, 2010

Related U.S. Application Data

(63) Continuation of application No. 11/149,698, filed on Jun. 10, 2005, now Pat. No. 7,676,441.

(30) Foreign Application Priority Data

Jun. 11, 2004 (JP) .................................. 2004-174601

(51) Int. Cl.
*G06E 1/00* (2006.01)
*G06E 3/00* (2006.01)
*G06F 15/18* (2006.01)
*G06G 7/00* (2006.01)

(52) U.S. Cl. ................ 706/16; 706/15; 706/26; 706/27; 706/31

(58) Field of Classification Search .................. None
See application file for complete search history.

(56) References Cited

U.S. PATENT DOCUMENTS

| 5,293,456 | A | * | 3/1994 | Guez et al. ....................... 706/20 |
| 6,128,606 | A | * | 10/2000 | Bengio et al. .................... 706/10 |
| 6,269,351 | B1 | * | 7/2001 | Black ............................... 706/15 |
| 7,016,529 | B2 | * | 3/2006 | Simard et al. .................. 382/155 |
| 2002/0038294 | A1 | * | 3/2002 | Matsugu .......................... 706/20 |
| 2003/0004583 | A1 | * | 1/2003 | Matsugu et al. .................. 700/4 |
| 2006/0204053 | A1 | * | 9/2006 | Mori et al. ..................... 382/118 |

FOREIGN PATENT DOCUMENTS

| JP | 05-197821 A | 8/1993 |
| JP | 05-257917 A | 10/1993 |
| JP | 2002-324226 A | 11/2002 |
| JP | 2003-296737 A | 10/2003 |

OTHER PUBLICATIONS

Simard et al. Best Practices for Convolutional Neural Networks Applied to Visual Document Analysis, International Conference on Document Analysis and Recognition, 2003, 6 pages.* Matsugu et al. "Convolutional spiking neural network model for robust face detection", Proceedings of the 9th international conference on neural information processing, 2002, pp. 660-664.*
Matsugu et al. "Subject independent facial expression recognition with robust face detection using a convolutional neural network", Elsevier Science, 2003, pp. 555-559.*
Lawrence et al., "Face recognition: a convolutional neural network approach", IEEE Transactions on Neural Networks, Special Issue on Neural Networks and Pattern Recognition, 1997, pp. 1-24.*
The above reference was cited in a Dec. 24, 2010 Japanese Office Action, which is enclosed without English Translation, that issued in Japanese Patent Application No. 2004-174601.
The above reference was cited in a Oct. 4, 2010 Japanese Office Action, which is enclosed without English Translation, that issued in Japanese Patent Application No. 2004-174601.

* cited by examiner

*Primary Examiner* — Omar F Fernandez Rivas
(74) *Attorney, Agent, or Firm* — Cowan, Liebowitz & Latman, P.C.

(57) ABSTRACT

In a hierarchical neural network having a module structure, learning necessary for detection of a new feature class is executed by a processing module which has not finished learning yet and includes a plurality of neurons which should learn an unlearned feature class and have an undetermined receptor field structure by presenting a predetermined pattern to a data input layer. Thus, a feature class necessary for subject recognition can be learned automatically and efficiently.

9 Claims, 15 Drawing Sheets

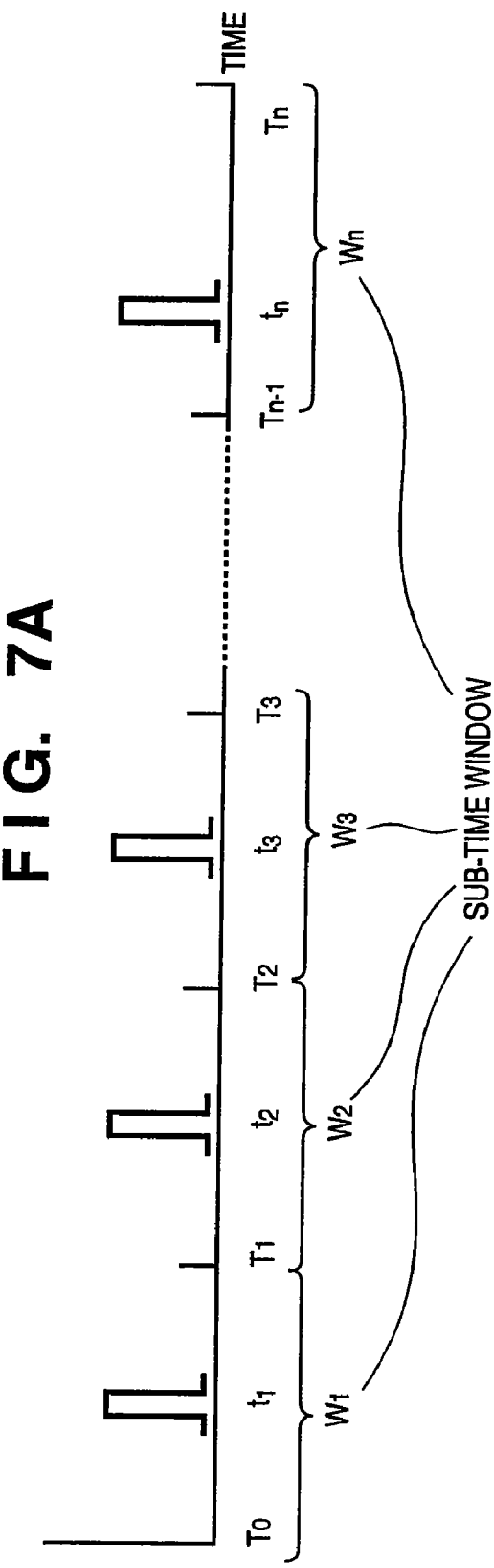
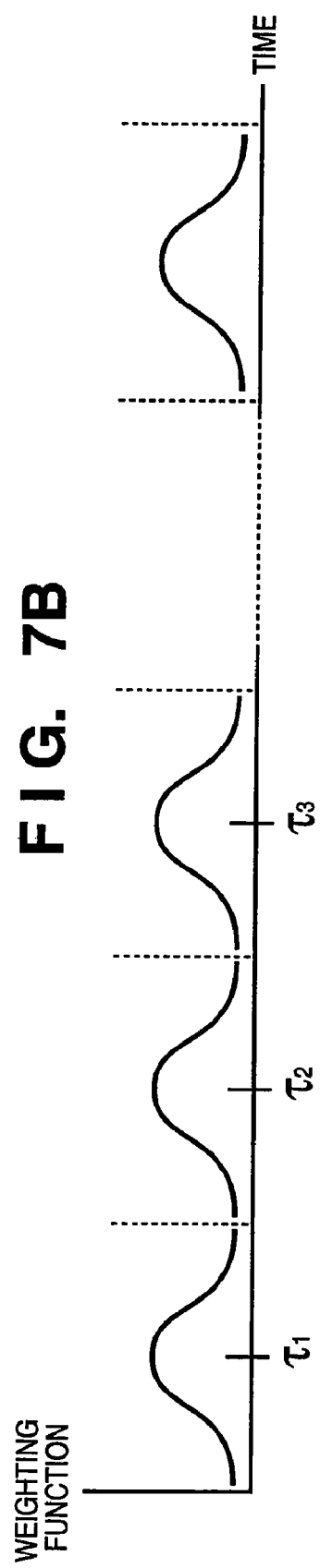
FIG. 7A
FIG. 7B

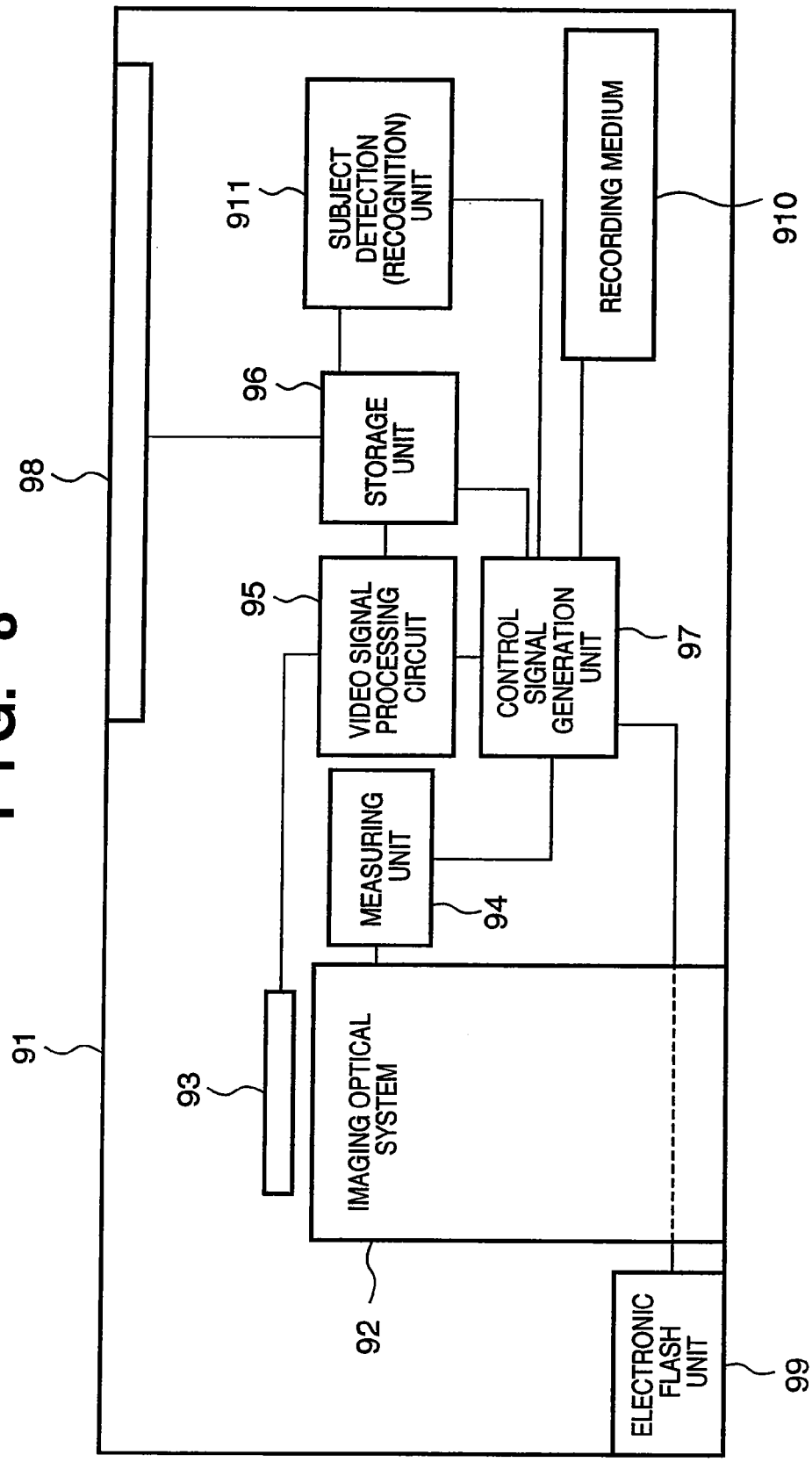

INFORMATION PROCESSING APPARATUS, INFORMATION PROCESSING METHOD, PATTERN RECOGNITION APPARATUS, AND PATTERN RECOGNITION METHOD

CROSS-REFERENCE TO RELATED APPLICATION

This application is a continuation of application Ser. No. 11/149,698, filed Jun. 10, 2005, now U.S. Pat No. 7,676,441, the entire disclosure of which is hereby incorporated by reference.

FIELD OF THE INVENTION

The present invention relates to a technique of executing arithmetic processing of a hierarchical neural network.

BACKGROUND OF THE INVENTION

As a method of enabling pattern recognition of a new category, a method using a neural network such as a multi-layer perceptron or radial basis function network is known well. Especially, of models capable of reducing the influence of noise, a method of executing hierarchical template matching of local features (e.g., non-patent reference 1 (Yanagawa, Fukushima, and Yoshida, "Additional Learnable Neocognitron", Technical Report of IEICE, NC2001-176, pp. 63-70, 2002)) is one of models capable of additional learning of a new category.

In patent reference 1 (Japanese Patent Registration No. 2780454), the threshold value of an inhibitory unit is corrected or a new excitatory unit is added in an intermediate layer, or the threshold value of an excitatory unit is corrected or a new inhibitory unit is added in an intermediate layer calculation unit in accordance with a recognition error signal, thereby enabling additional learning.

In patent reference 2 (Japanese Patent Registration No. 2779119), the weight of the sub-categorization unit is corrected on the basis of a signal obtained by weighting a learning control signal reflecting the degree of progress of learning by the degree of group membership output from the categorization unit. Since the category adding unit adds a new category to the sub-categorization unit as needed, additional learning can effectively be performed.

In the arrangement disclosed in patent reference 3 (Japanese Patent Laid-Open No. 9-62648), learning of the pattern validation unit is controlled by using recognition error pattern data and pattern recognition internal state data at the time of recognition error. Additional learning is repeated without relearning, thereby decreasing recognition errors.

Patent reference 4 (Japanese Patent Laid-Open No. 5-274455) comprises a learning control means, having already learned connections, for allowing a user to rewrite an arbitrary synapse connection, and a mechanism which causes an intermediate layer neuron to present a supervisory signal for additional learning.

Patent reference 5 (Japanese Patent Laid-Open No. 2002-42107) discloses a method, in which the learning coefficient between the intermediate layer and the output layer is made larger than that between the input layer and the intermediate layer, thereby enabling high-speed learning without any large change in the structure of the loose connection module which has already finished learning.

Patent reference 6 (Japanese Patent Laid-Open No. 9-138785) discloses a method of properly identifying an unlearned pattern. In this method, learning is done such that when a boundary pattern outside the category range is input to the input unit group, each unit of the output unit group outputs 0 or a small value.

In a hierarchical neural network which executes learning by back propagation, a constructive back propagation (to be abbreviated as CBP hereinafter) is known, which adds a unit of a hidden layer (e.g., non-patent reference 2 ((M. Lehtokangas, "Modeling with constructive backpropagation," Neural Networks, vol. 12, pp. 707-716, 1999)). In CBP, an already learned connection updates only a connection from a permanently added unit to the output layer in accordance with BP.

In the above-described prior arts, it is difficult to efficiently execute learning (adjustment of internal parameters such as the number of modules of the neural network and the connection weight distribution) for recognition of an arbitrary new pattern (unlearned feature pattern). In addition, the type of a feature useful for internal representation of an arbitrary pattern cannot be known in advance. The connection (so-called receptor field) between operation elements suitable for detecting a useful feature cannot efficiently be learned.

For example, in non-patent reference 1, when a predetermined S-layer neuron having random connection outputs a larger value than an S-layer neuron having selectivity for another feature class, a class for detection of a new feature category is added, thereby enabling additional learning. However, it is not guaranteed that the feature class learned at this time is a new and effective feature category. It is not guaranteed either that the feature class is effective for recognizing an object of another class.

In non-patent reference 2, it is not always guaranteed that the newly added unit executes learning to minimize errors, i.e., learns a connection suitable for detecting a feature class useful for a given pattern recognition problem and, more particularly, detection of a new category. For this reason, it is difficult to execute efficient learning as a whole in recognizing a complex pattern.

In patent reference 2, when the category to which an input pattern signal to be learned belongs does not belong to the sub-categorization unit to execute learning, the currently input pattern signal is input to the category dictionary as a reference pattern, thereby enabling additional learning to recognize the new category. However, since the reference pattern itself is input as the new category, it is not guaranteed that proper recognition can be done even when the pattern is deformed. For this reason, it is difficult to execute efficient recognition and learning operation using a few hardware resources (circuit elements or memory space).

In patent reference 4, especially synapse connections on the input layer side are learned, and connections on the output layer side are fixed. However, no new processing module corresponding to a new category is added. Hence, it is difficult to sufficiently implement adaptation to environment and versatility.

SUMMARY OF THE INVENTION

The present invention has been made in consideration of the above problems, and has as its object to provide a technique of causing a hierarchical neural network having a module structure to automatically and efficiently learn a feature class necessary for subject recognition.

In order to achieve an object of the present invention, for example, an information processing apparatus of the present invention comprises the following arrangement.

That is, an information processing apparatus which includes a data input layer and an arithmetic processing layer having at least one layer level and a plurality of processing modules corresponding to a plurality of feature classes to be detected and executes parallel hierarchical processing, comprising:

at least one processing module which has finished learning, which includes a plurality of neurons having a receptor field structure used to detect a predetermined feature class in the arithmetic processing layer of at least one predetermined layer level; and at least one processing module which has not finished learning yet, which includes a plurality of neurons which should learn an unlearned feature class and have an undetermined receptor field structure, wherein learning necessary for detection of a new feature class is executed in the processing module which has not finished learning yet by presenting a predetermined pattern to the data input layer.

In order to achieve an object of the present invention, for example, an information processing apparatus of the present invention comprises the following arrangement.

That is, an information processing apparatus which includes a data input layer, an arithmetic processing layer having at least one layer level and a plurality of processing modules corresponding to feature classes to be detected, a learning control circuit, and a processing module addition/deletion control circuit, comprising:

determination means for determining whether an error signal of an operation element output at a predetermined layer level in the arithmetic processing layer satisfies a predetermined condition in a predetermined learning step executed by the learning control circuit; and control means for, when the determination means determines that the predetermined condition is satisfied, executing control to cause the processing module addition/deletion control circuit to add at least one processing module in a layer of a level lower than the layer level.

In order to achieve an object of the present invention, for example, an information processing apparatus of the present invention comprises the following arrangement.

That is, an information processing apparatus comprising:

an input layer which inputs predetermined input data;

independent component analysis means for executing independent component analysis for a predetermined data set;

learning control means;

an arithmetic processing layer which has at least one layer level and a plurality of processing modules corresponding to a plurality of feature classes to be detected; and learning data setting means for setting learning input data containing a predetermined feature class to be learned by a predetermined processing module from the input data and a predetermined base data set obtained as a result of independent component analysis and storing the learning input data in a predetermined memory, wherein the arithmetic processing layer of at least one predetermined layer level comprises at least one processing module which has finished learning, which includes a plurality of neurons having a receptor field structure used to detect a predetermined feature class, and at least one processing module which has not finished learning yet, which includes a plurality of neurons which should learn an unlearned feature class and have an undetermined receptor field structure, and the learning control means executes learning necessary for detection of a new feature class in the processing module which has not finished learning yet by presenting the predetermined learning input data to a predetermined layer of the arithmetic processing layer.

In order to achieve an object of the present invention, for example, a pattern recognition apparatus of the present invention comprises the following arrangement.

That is, a pattern recognition apparatus comprising:

a data input layer;

an arithmetic processing layer which has at least one layer level and a plurality of processing modules corresponding to a plurality of feature classes to be detected;

learning control means; and recognition result output means for outputting a predetermined pattern recognition result on the basis of an output from the arithmetic processing layer, wherein the arithmetic processing layer of at least one predetermined layer level comprises at least one processing module which has finished learning, which includes a plurality of neurons having a receptor field structure used to detect a predetermined feature class, and at least one processing module which has not finished learning yet, which includes a plurality of neurons which should learn an unlearned feature class and have an undetermined receptor field structure, and the learning control means executes learning necessary for detection of a new feature class in the processing module which has not finished learning yet by presenting a predetermined pattern to the data input layer.

In order to achieve an object of the present invention, for example, a pattern recognition apparatus of the present invention comprises the following arrangement.

That is, a pattern recognition apparatus comprising:

a data input layer;

an arithmetic processing layer which has at least one layer level and a plurality of processing modules corresponding to a plurality of feature classes to be detected;

a learning control circuit;

a processing module addition/deletion control circuit; and recognition result output means for outputting a predetermined pattern recognition result on the basis of an output from the arithmetic processing layer, wherein when an error signal of an operation element output at a predetermined layer level in the arithmetic processing layer satisfies a predetermined condition in a predetermined learning step executed by the learning control circuit, the processing module addition/deletion control circuit adds at least one processing module in a layer of a level lower than the layer level.

In order to achieve an object of the present invention, for example, an information processing method of the present invention comprises the following arrangement.

That is, an information processing method executed by an information processing apparatus which includes a data input layer, an arithmetic processing layer having at least one layer level and a plurality of processing modules corresponding to a plurality of feature classes to be detected, at least one processing module which has finished learning, which includes a plurality of neurons having a receptor field structure used to detect a predetermined feature class in the arithmetic processing layer of at least one predetermined layer level, and at least one processing module which has not finished learning yet, which includes a plurality of neurons which should learn an unlearned feature class and have an undetermined receptor field structure, wherein learning necessary for detection of a new feature class is executed in the processing module which has not finished learning yet by presenting a predetermined pattern to the data input layer.

In order to achieve an object of the present invention, for example, an information processing method of the present invention comprises the following arrangement.

That is, an information processing method executed by an information processing apparatus which includes a data input layer, an arithmetic processing layer having at least one layer level and a plurality of processing modules corresponding to feature classes to be detected, a learning control circuit, and a processing module addition/deletion control circuit, comprising:

a determination step of determining whether an error signal of an operation element output at a predetermined layer level in the arithmetic processing layer satisfies a predetermined condition in a predetermined learning step executed by the learning control circuit; and a control step of, when it is determined in the determination step that the predetermined condition is satisfied, executing control to cause the processing module addition/deletion control circuit to add at least one processing module in a layer of a level lower than the layer level.

In order to achieve an object of the present invention, for example, an information processing method of the present invention comprises the following arrangement.

That is, an information processing method executed by an information processing apparatus which includes an input layer which inputs predetermined input data, independent component analysis means for executing independent component analysis for a predetermined data set, learning control means, an arithmetic processing layer which has at least one layer level and a plurality of processing modules corresponding to a plurality of feature classes to be detected, and learning data setting means for setting learning input data containing a predetermined feature class to be learned by a predetermined processing module from the input data and a predetermined base data set obtained as a result of independent component analysis and storing the learning input data in a predetermined memory, the arithmetic processing layer of at least one predetermined layer level including at least one processing module which has finished learning, which includes a plurality of neurons having a receptor field structure used to detect a predetermined feature class, and at least one processing module which has not finished learning yet, which includes a plurality of neurons which should learn an unlearned feature class and have an undetermined receptor field structure, wherein the learning control means executes learning necessary for detection of a new feature class in the processing module which has not finished learning yet by presenting the predetermined learning input data to a predetermined layer of the arithmetic processing layer.

In order to achieve an object of the present invention, for example, a pattern recognition method of the present invention comprises the following arrangement.

That is, a pattern recognition method executed by a pattern recognition apparatus including a data input layer, an arithmetic processing layer which has at least one layer level and a plurality of processing modules corresponding to a plurality of feature classes to be detected, learning control means, and recognition result output means for outputting a predetermined pattern recognition result on the basis of an output from the arithmetic processing layer, the arithmetic processing layer of at least one predetermined layer level including at least one processing module which has finished learning, which includes a plurality of neurons having a receptor field structure used to detect a predetermined feature class, and at least one processing module which has not finished learning yet, which includes a plurality of neurons which should learn an unlearned feature class and have an undetermined receptor field structure, wherein the learning control means executes learning necessary for detection of a new feature class in the processing module which has not finished learning yet by presenting a predetermined pattern to the data input layer.

In order to achieve an object of the present invention, for example, a pattern recognition method of the present invention comprises the following arrangement.

That is, a pattern recognition method executed by a pattern recognition apparatus including a data input layer, an arithmetic processing layer which has at least one layer level and a plurality of processing modules corresponding to a plurality of feature classes to be detected, a learning control circuit, a processing module addition/deletion control circuit, and recognition result output means for outputting a predetermined pattern recognition result on the basis of an output from the arithmetic processing layer, wherein when an error signal of an operation element output at a predetermined layer level in the arithmetic processing layer satisfies a predetermined condition in a predetermined learning step executed by the learning control circuit, the processing module addition/deletion control circuit adds at least one processing module in a layer of a level lower than the layer level.

In order to achieve an object of the present invention, for example, an information processing apparatus of the present invention comprises the following arrangement.

That is, an information processing apparatus which executes processing of correcting a connection constant between layers to set, as a desired output value, an output value from each neuron included in a predetermined processing module in a predetermined detection layer in a hierarchical neural network which is constituted by alternately arranging, between a data input layer and a data output layer, a detection layer which includes a plurality of processing modules to detect a feature amount to be detected from an output from a layer of a preceding stage and an integration layer which integrates and outputs outputs from the detection layer, comprising:

error calculation means for obtaining an error between the desired output value and the output value from each neuron included in the predetermined processing module in the predetermined detection layer;

addition means for adding a new processing module in accordance with the error in at least one layer of the layers arranged between the data input layer and the layer which outputs the output value to the predetermined processing module; and correction means for, after addition processing by the addition means, correcting the connection constant between a predetermined number of layers from the predetermined detection layer to the data input layer on the basis of the error by the error calculation means.

In order to achieve an object of the present invention, for example, an information processing method of the present invention comprises the following arrangement.

That is, an information processing method of executing processing of correcting a connection constant between layers to set, as a desired output value, an output value from each neuron included in a predetermined processing module in a predetermined detection layer in a hierarchical neural network which is constituted by alternately arranging, between a data input layer and a data output layer, a detection layer which includes a plurality of processing modules to detect a feature amount to be detected from an output from a layer of a preceding stage and an integration layer which integrates and outputs outputs from the detection layer, comprising:

an error calculation step of obtaining an error between the desired output value and the output value from each neuron included in the predetermined processing module in the predetermined detection layer;

an addition step of adding a new processing module in accordance with the error in at least one layer of the layers arranged between the data input layer and the layer which outputs the output value to the predetermined processing module; and a correction step of, after addition processing in the addition step, correcting the connection constant between a predetermined number of layers from the predetermined detection layer to the data input layer on the basis of the error in the error calculation step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 7A and 7B are timing charts for explaining processing of a plurality of pulses;

FIG. 8 is a block diagram showing the schematic arrangement of a pattern recognition apparatus by parallel pulse signal processing and an image input apparatus (e.g., a camera, video camera, or scanner) including the pattern recognition apparatus according to the first embodiment of the present invention;

DETAILED DESCRIPTION OF THE PREFERRED EMBODIMENTS

Preferred embodiments of the present invention will now be described in detail in accordance with the accompanying drawings.

First Embodiment

Figure 1:
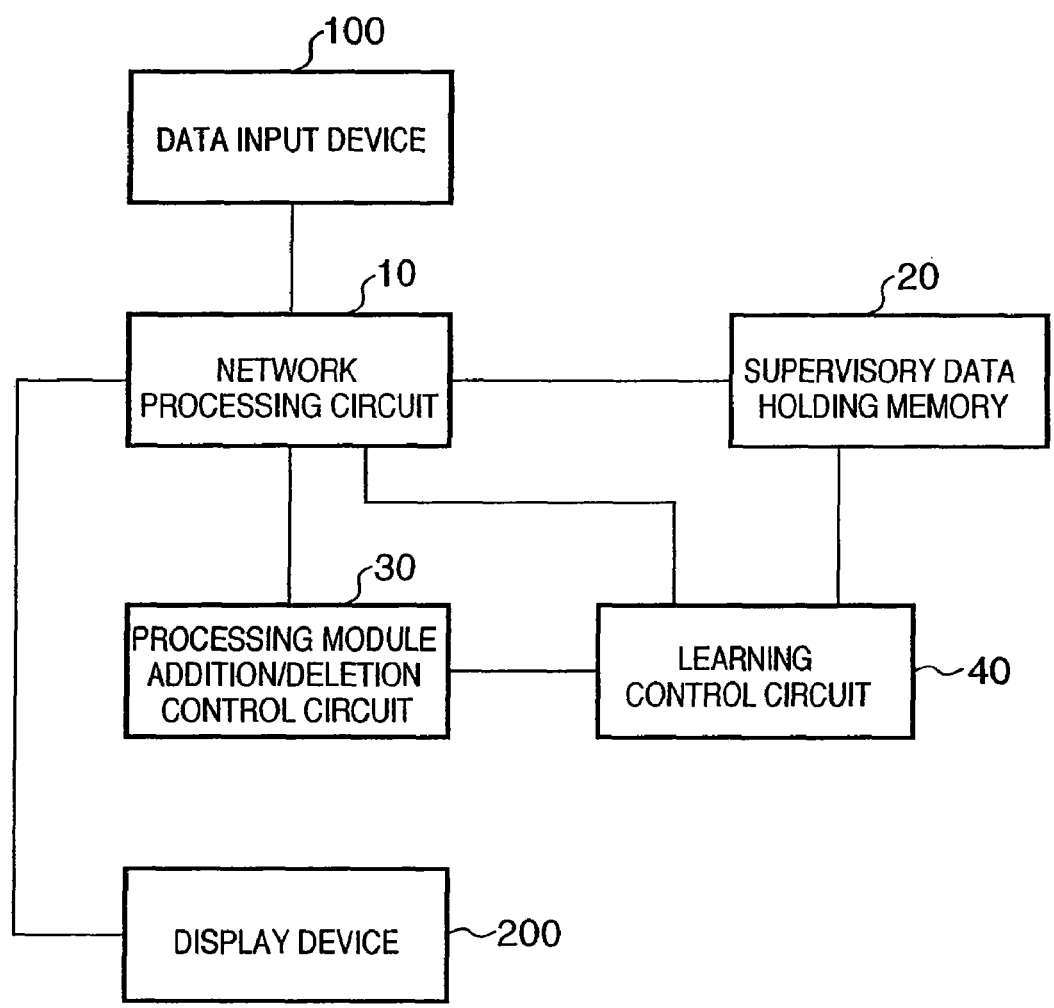
FIG. 1 is a block diagram showing the functional arrangement of an apparatus (pattern recognition apparatus) which executes pattern recognition processing according to the first embodiment of the present invention.

FIG. 1 is a block diagram showing the functional arrangement of an apparatus (pattern recognition apparatus) which executes pattern recognition processing according to the first embodiment. The apparatus shown in FIG. 1 has a structure for hierarchical parallel processing. The apparatus receives image data and mainly processes information related to detection of an object (subject) of a specific category or a local feature (e.g., geometrical feature) of the object. As the processing result, information representing whether the recognition object of the specific category is present in the received data is output and, when the object is present, information representing the position of the object is output.

This pattern recognition apparatus includes an image input device 100, network processing circuit 10, supervisory data holding memory 20, processing module addition/deletion control circuit 30, learning control circuit 40, and display device 200.

The network processing circuit 10 executes image recognition by parallel hierarchical processing and outputs the processing result to the display device 200. The supervisory data holding memory 20 holds, as supervisory data, the data of a local feature contained in a recognition object as a constituent element. The supervisory data is presented to a predetermined feature detection processing module in the network processing circuit 10 and used, under the control of the learning control circuit 40, by the processing module presented the supervisory data and another processing module which outputs data to that processing module to execute a predetermined learning operation. This will be described later in more detail.

The processing module addition/deletion control circuit 30 adds or deletes a processing module to execute predetermined feature detection in an arbitrary processing layer in the network processing circuit 10. The arrangement and processing contents of each processing module will be described later.

Figure 2:
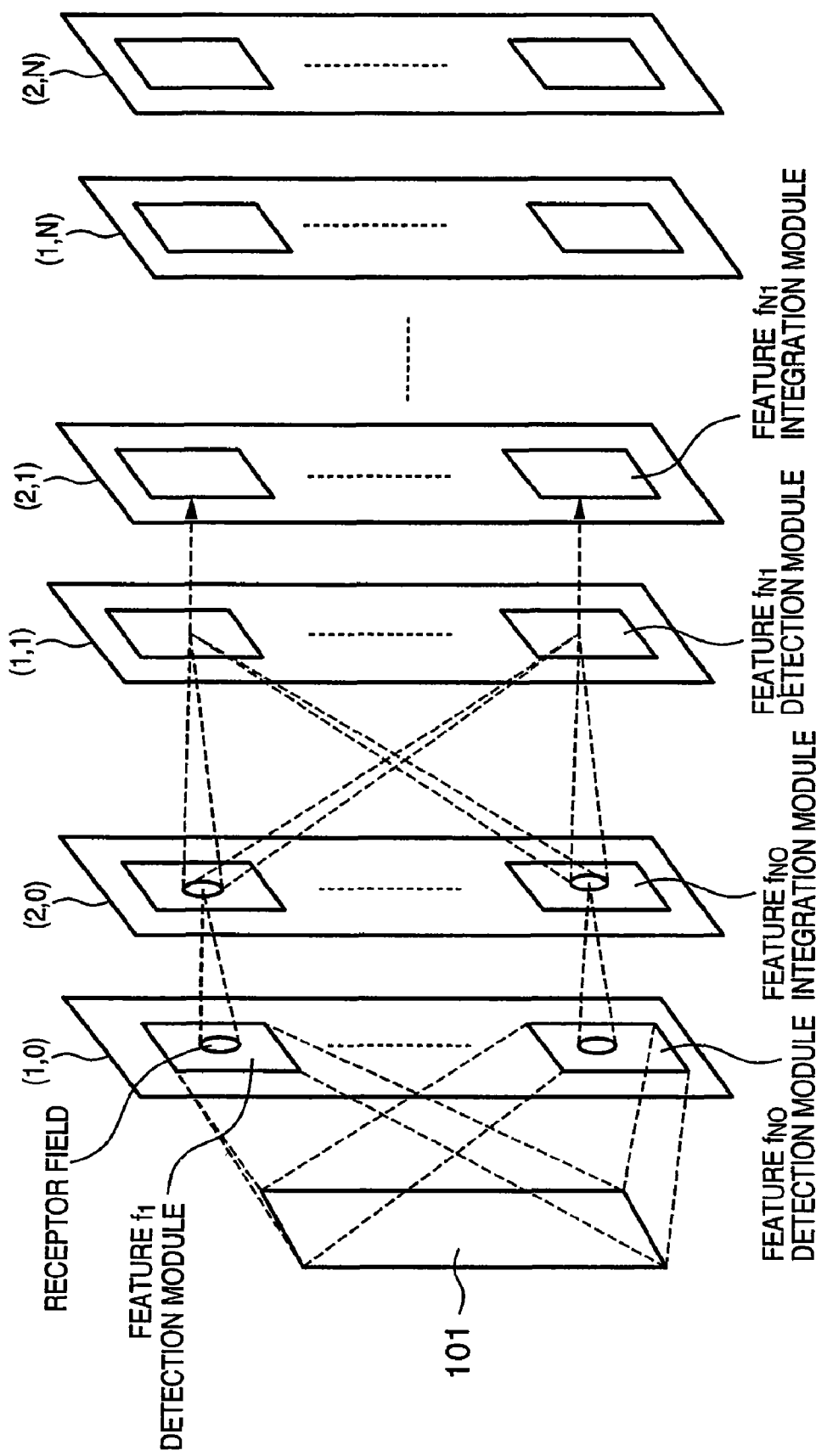
FIG. 2 is a view showing the functional arrangement of a network processing circuit 10 used in the first embodiment of the present invention.

FIG. 2 is a view showing the functional arrangement of the network processing circuit 10 used in this embodiment. As shown in FIG. 2, the network processing circuit 10 executes processing using a hierarchical neural network. The hierarchical neural network will be described below.

The arrangement shown in FIG. 2 includes the arrangement of a so-called convolutional neural network or convolutional network structure (LeCun, Y. and Bengio, Y., 1995, "Convolutional Networks for Images Speech, and Time Series", in Handbook of Brain Theory and Neural Networks (M. Arbib. Ed.), MIT Press, pp. 255-258). The final output (output from a layer (2,N)) is the recognition result indicating the category of the recognized object and its position in the input data.

The basic structure of the convolutional NN is a hierarchical structure in which feature detection layers (1,0), (1,1), . . . and feature integration layers (2,0), (2,1), . . . are alternately arranged. Each feature detection layer detects a "more complex local feature" formed by appropriately arranging a plurality of local features as constituent elements. Each feature integration layer extracts the representative value in the local region from the output distribution of the feature detection layer, thereby contributing to the robust recognition performance for a variation. In this embodiment, there is no interaction between processing modules in each layer in the network processing circuit 10. Only interlayer connections are present.

Each feature detection layer incorporates a plurality of processing modules to detect the composite local feature of a predetermined class (category). Feature detection elements (neurons) which exist in correspondence with the sampling positions of input image data are arrayed in each processing module in the feature detection layer. Each feature detection element in each of the feature detection layers (1,1), (1,2), . . . except the lowest layer (1,0) receives outputs corresponding to lower-order local feature detection results from a plurality of processing modules in the feature integration layer of the preceding stage (or data input layer).

Each local feature is contained in a composite local feature to be detected by the feature detection elements. Each composite local feature corresponds to a local feature contained in a feature to be detected by an upper feature detection layer. The neurons in each processing module have the same receptor field structure to detect the local feature of the same class. This structure is unique to the convolutional network (convolutional neural network) and will be referred to as a shared receptor field structure hereinafter. The array of neurons in each processing module of the feature detection layer has a topological structure to hold the positional relationship with respect to input data. The neuron element and synapse circuit to be described below are included in the hierarchical neural network, as a matter of course, and are therefore included in the network processing circuit 10.

<Neuron Element>

The neuron included in each layer will be descried next. Each neuron element is an extended model based on a so-called integrate-and-fire neuron. This neuron equals the so-called integrate-and-fire neuron because it fires and outputs a pulse-like signal when a result obtained by spatio-temporally linearly adding an input signal (pulse train corresponding to an action potential) exceeds a threshold value.

Time $T_{w1}$ corresponding to the maximum value of a weighting function shown in FIG. 7B which gives a time integration characteristic (reception sensitivity characteristic) for a pulse which is pulse-phase-modulated by a synapse connection is generally set at an earlier timing than expected arrival time $T_{s1}$ of a pulse (FIG. 7A) unique to the feature given by the synapse connection. As a result, a pulse which has arrived earlier than the expected arrival time within a predetermined range (in the example shown in FIGS. 7A and 7B, a pulse which has arrived too early is attenuated) is temporally integrated by a neuron to receive that pulse as a pulse signal having a high output level. The weighting function need not always have the symmetrical shape of a gaussian function and may have an asymmetrical shape. As is apparent from the above description, the center of each weighting function shown in FIG. 7B is not the expected pulse arrival time.

As the neuron element, a known circuit arrangement which oscillates with a predetermined delay in timing when the sum of inputs obtained by using, e.g., a window function exceeds the threshold value may be used.

The neurons in the feature detection layer have a receptor field structure corresponding to a feature category, as described above. When a weight sum value (to be described later) by the time window function of the input pulse signal (current value or potential) from the neurons of the layer (input layer or feature integration layer) of the preceding stage, the neuron outputs a pulse (the pulse is given by a phase change; the frequency, amplitude, or pulse width may be changed) which takes a value of a nondecreasing nonlinear function such as a sigmoid function, i.e., a so-called squashing function value which asymptotically saturates to a predetermined level in accordance with the sum value.

<Synapse Circuit>

Figure 4A:
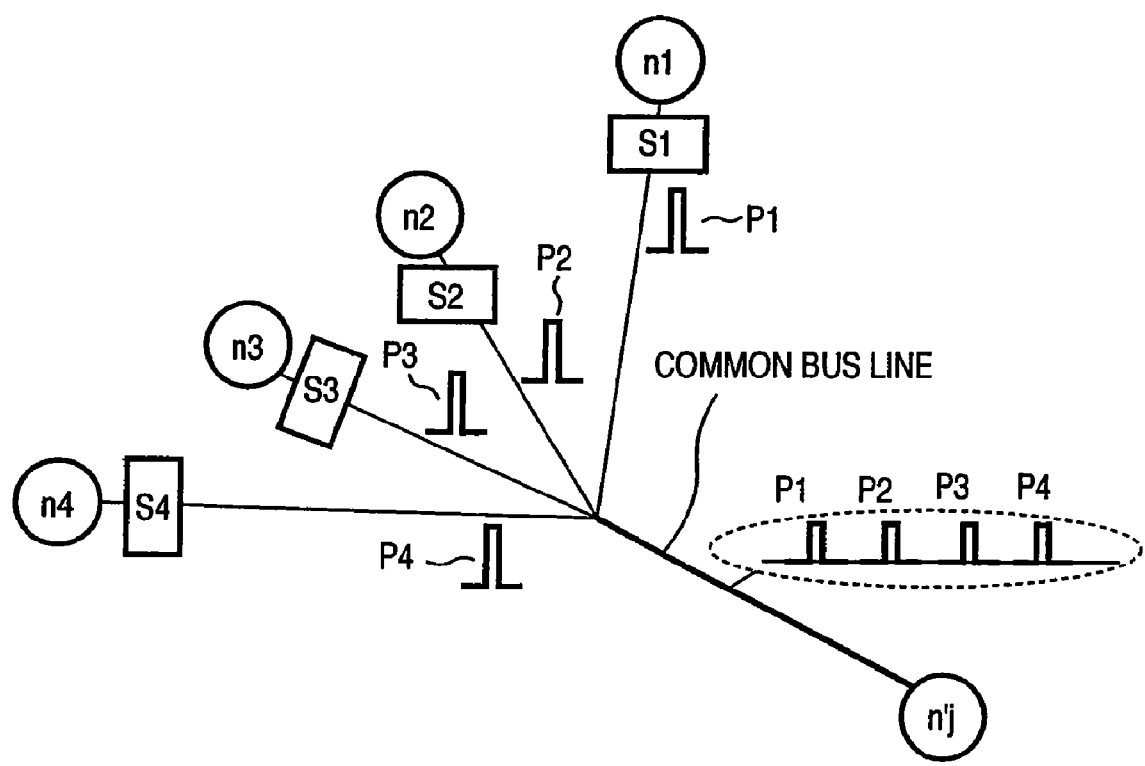
FIG. 4A is a view schematically showing pulse signal propagation from a feature integration layer to a feature detection layer (e.g., from a layer (2,0) to a layer (1,1) in FIG. 1)
Figure 4B:
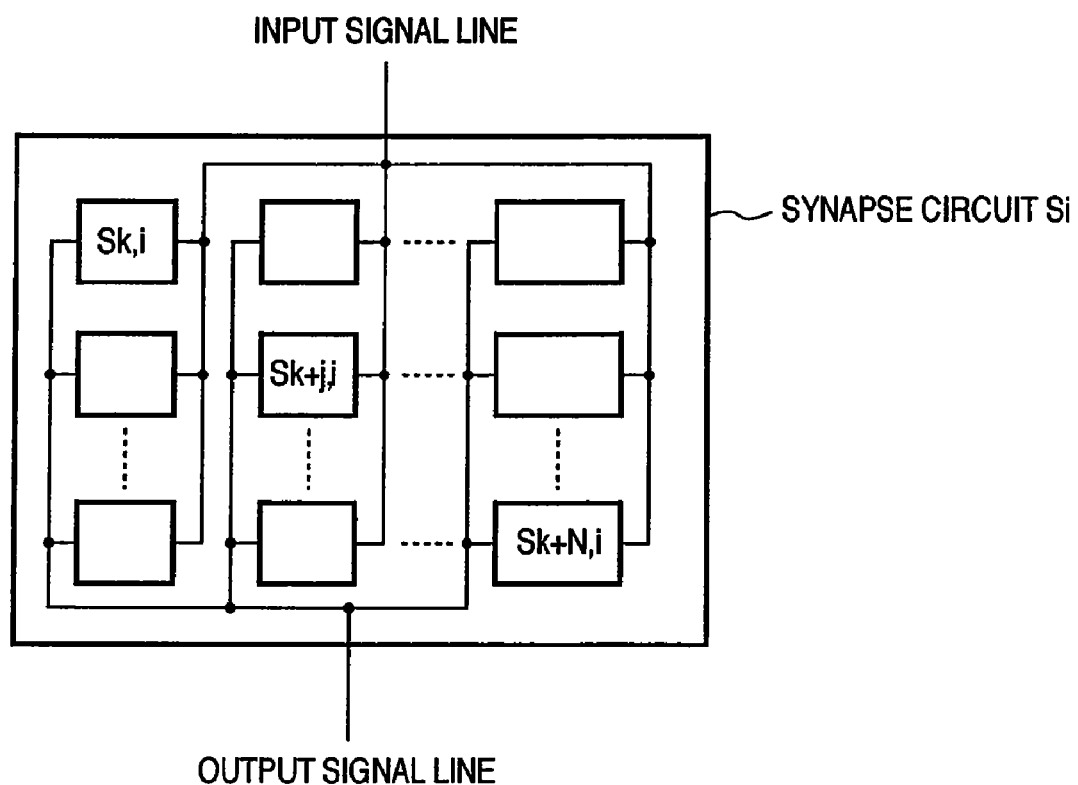
FIG. 4B is a view showing the arrangement of a synapse circuit formed by arranging, in a matrix, sub-circuits which give the synapse connection intensity (which indicates the magnitude of modulation related to a phase delay or the like) to each neuron $n'_j$ as the connection destination of a neuron $n_i$.

FIG. 4B is a view showing the arrangement of a synapse circuit formed by arranging, in a matrix, sub-circuits which give the synapse connection intensity (which indicates the magnitude of modulation related to a phase delay or the like) to each neuron $n'_j$ as the connection destination of a neuron $n_i$.

To hold a connection weight value for a long time, the connection weight may be stored by writing it in an analog nonvolatile memory, floating gate element, or digital memory based on an FeRAM or MRAM. Alternatively, a known circuit arrangement to reduce the circuit scale can also be used.

<Processing Contents and Neuron Receptor Field Structure of Each Layer>

Main parts of the network processing circuit 10 will be described below in more detail. The data input layer comprises a CMOS sensor for an image sensor means or a photoelectric conversion element such as CCD element. High-order data obtained from the analysis result (e.g., the result obtained by executing dimension reduction such as principal component analysis or vector quantization) of a predetermined data analysis means may be input.

The feature detection layer (1,0) is a layer to execute multi-resolution processing such as Gabor wavelet transform or edge line segment detection. The feature detection layer detects local low-order features (the feature may contain a color component feature in addition to a geometrical feature) of an image pattern at the respective positions on the entire screen (or at predetermined sampling points on the entire screen) equal in number to a plurality of feature categories at a plurality of scale levels or resolutions at the same position. The feature detection layer has a receptor field structure corresponding to a feature category (e.g., when a line segment in a predetermined direction is to be extracted as a geometrical feature, the tilt of a line segment).

An index k is 1 or more. A feature integration layer (2,k) has a predetermined receptor field structure (the receptor field will indicate the connection range to the output element of the immediately preceding layer, and the receptor field structure will indicate the distribution of the connection weight hereinafter). A feature integration layer neuron executes "integration" by arithmetic processing such as local averaging of a plurality of neuron element outputs in the receptor field on a feature detection layer (1,k) (e.g., weighted averaging for outputs from a local region of the receptor field) or sub-sampling by maximum output extraction. The receptor fields of the neurons in the same feature integration layer have a common structure. A neuron in each of the feature detection layers (1,1), (1,2), ..., (1,N) and each of the feature integration layers (2,1), (2,2), ..., (2,N) has a predetermined receptor field structure which is determined depending on the type of feature to be detected.

In the former (feature detection layers (1,1), (1,2), ..., (1,N)), each feature detection module detects a plurality of different local features which exist with a predetermined spatial layout relationship. The latter (feature integration layers (2,1), (2,2), ..., (2,N)) integrates detection results about a plurality of features from the feature detection layer of the preceding stage. In sub-sampling executed by the feature integration layer, averaging or maximum value detection is executed for outputs from local regions (local receptor fields of the feature integration layer neurons) of feature detection cells of the same feature category.

<Processing (Low-Order Feature Extraction by Gabor Wavelet Transform) in Feature Detection Layer (1,0)>

The feature detection layer (1,0) has a neuron to detect a pattern structure (low-order feature) which indicates a local region with a predetermined size and has a predetermined spatial frequency component and a vertical direction component. This function can be implemented by a Gabor filter. The feature detection filter function of each neuron in the feature detection layer (1,0) will be described below.

The feature detection layer (1,0) includes a feature extraction processing module group which executes Gabor wavelet transform represented by a filter set with different scale selectivities and different direction component selectivities. Each neuron (or each group including a plurality of neurons) in a module has a predetermined Gabor filter function. The method of executing Gabor wavelet transform in a neural network is described in detail in a reference by Daugman (1988) (IEEE Trans. on Acoustics, Speech, and Signal Processing, Vol. 36, pp. 1169-1179).

Each neuron of the feature detection layer (1,0) belonging to the Gabor wavelet transform processing module has a receptor field structure corresponding to the characteristic of the Gabor filter. Feature detection layer neurons belonging to Gabor filters of the same scale index have receptor fields with the same size. Arithmetically, the corresponding kernel size also has a size corresponding to the scale index. The scales are set in descending order of 30×30, 15×15, 7×7 on an input image. Each neuron outputs a pulse at an output level (the level is represented by the pulse phase here, although the level may be represented by the frequency, amplitude, or pulse width) as a nonlinear squashing function of a wavelet transform coefficient value obtained by inputting the sum of the products of the distribution weighting coefficient and image data. When the output level is represented by the pulse phase, the output level becomes high as the time delay from the reference timing signal (generated outside or in the arithmetic processing layer) is small.

As already described, in the feature detection layer (1,0), when a new processing module is added by the processing module addition/deletion control circuit 30, a detection module for a local feature of a new category, which is contained in the feature to be detected by the processing module in the layer of the subsequent stage (e.g., (1,1)), is formed by learning.

<Processing in Feature Detection Layer (Middle-Order, High-Order Feature Extraction)>

The receptor field structure of the neuron in each processing modules of the subsequent feature detection layers ((1,1), (1,2), ...) forms a receptor field structure to detect a feature unique to the recognition target pattern by supervised learning (so-called back propagation learning rule), unlike the processing module formed in advance in the feature detection layer (1,0). The size of the local region where feature detection is executed approaches stepwise the size of the entire recognition target toward the final layer so that the middle- or high-order features are detected geometrically. For example, for detection/recognition of a face, middle-order (or high-order) features are features at the graphic element level such as eyes, nose, and mouth in the face.

Each feature detection layer has two processing modules formed in advance in the initial state. The receptor field structure of each neuron in each processing module is given at random. Learning in each processing module of the feature detection layers ((1,1), (1,2), ...) is executed sequentially in ascending order of layer level for each processing module of each layer. Connection between the lower layer (feature integration layer) and each neuron belonging to the processing module which has finished learning is corrected within a predetermined range later by learning in a processing module belonging to an upper feature detection layer. At this time, update of synapse connection is controlled by the learning control circuit 40 such that the connection does not largely change.

Figure 3:
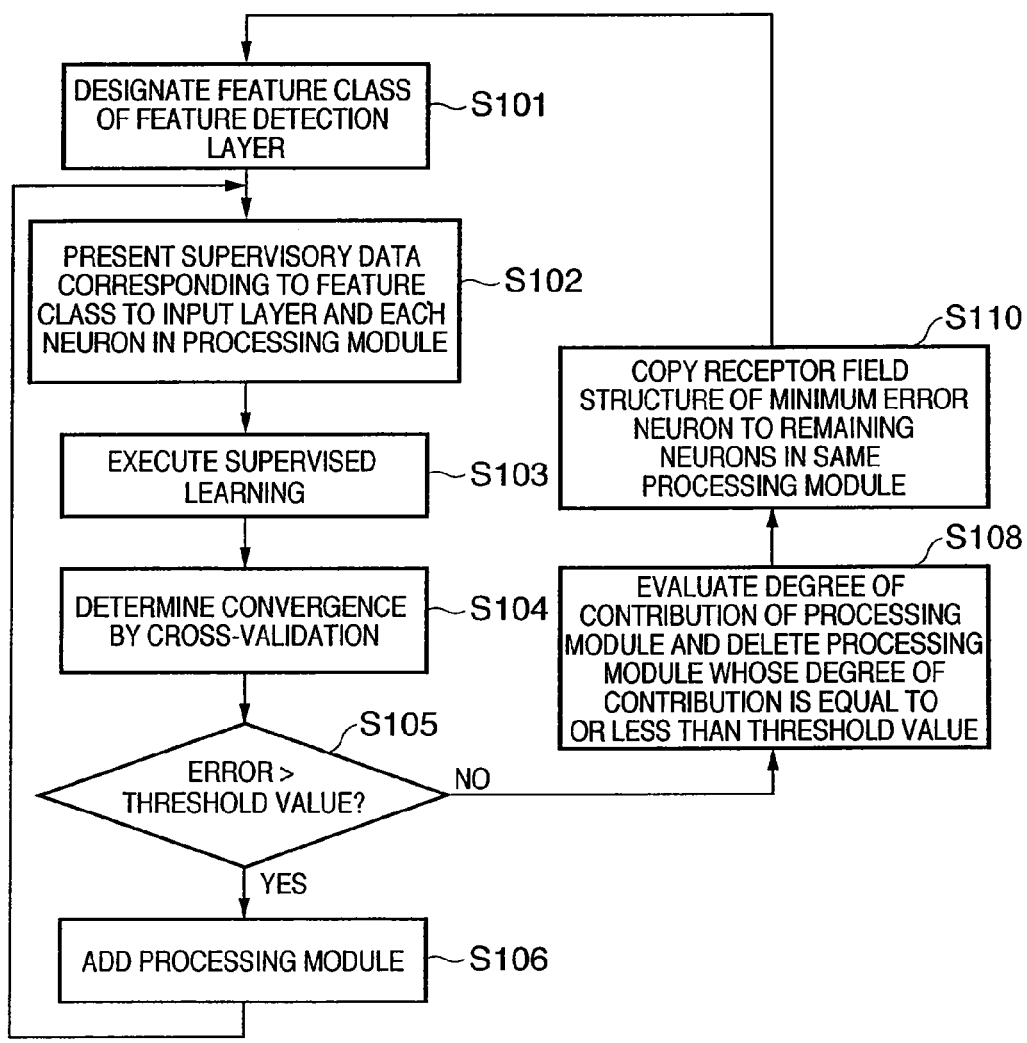
FIG. 3 is a flowchart of learning control processing by a learning control circuit 40.

FIG. 3 is a flowchart of learning control processing by the learning control circuit 40.

The learning control circuit 40 designates each processing module (feature class) of the feature detection layers ((1,1), (1,2), ...) (step S101). Supervisory data is read out from the supervisory data holding memory 20. Training input data is presented (input) to each neuron of the input layer. Training supervisory data is presented (input) to a predetermined neuron in the processing module designated in step S101 (step S102). Supervised learning (e.g., back propagation learning) is executed (step S103).

The learning control circuit 40 monitors the learning process. When learning progresses to some extent, the learning control circuit 40 executes error determination (step S104) by so-called cross-validation and comparison with the threshold value of a learning error (to be described later) (step S105). If the minimum error value in the same processing module is larger than a predetermined threshold value, and the error change rate (e.g., difference to the preceding learning error) is less than a predetermined reference value, the learning control circuit 40 inputs a control signal to the processing module addition/deletion control circuit 30 to add a processing module in the lower feature detection layer (step S106). Deletion of a processing module (processing in step S108) will be described later.

If it is determined by learning convergence determination (the minimum error value in the processing module is equal to or smaller than the threshold value, and the error change rate is equal to or less than the predetermined reference value) in step S105 that the error is equal to or smaller than the threshold value, the receptor field structure of the neuron which gives the minimum error value in the processing module is copied to the remaining neurons belonging to the same processing module (step S110). With this processing, the processing module which has finished learning is formed.

<Processing in Feature Integration Layer>

The neuron of a feature integration layer ((2,0), (2,1), ...) will be described. As shown in FIG. 1, connection from a feature detection layer (e.g., (1,0)) to a feature integration layer (e.g., (2,0)) is designed such that the excitatory connection input is received from the neuron of the same feature element (type) of the feature detection layer of the preceding stage in the receptor field of the neuron of feature integration. The function of the neuron of the integration layer is local averaging for each feature category or sub-sampling by maximum value detection, as described above.

According to the former function, pulses representing feature detection of same type are received from a plurality of neurons and integrated and averaged in a local region (receptor field), or a representative value such as a maximum value in the receptor field is calculated, thereby properly detecting even fluctuation or deformation of the position of the feature. For this reason, the receptor field structure of the feature integration layer neuron may be designed to be uniform (for example, the receptor field is a rectangular region having a predetermined size in which sensitivities or weight coefficients are uniformly distributed) regardless of the feature category.

<Learning Process and Processing Module Addition/Deletion Process>

Figure 5A:
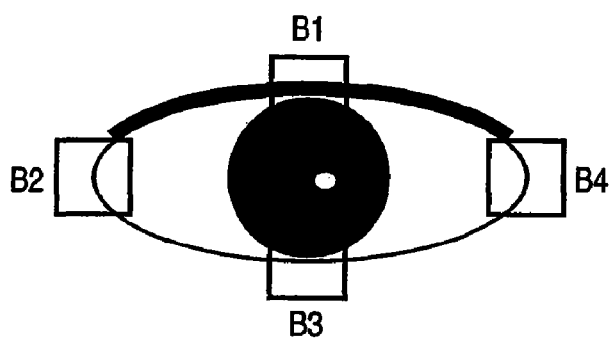
FIG. 5A-5D are views showing local features of an eye.
Figure 5B:
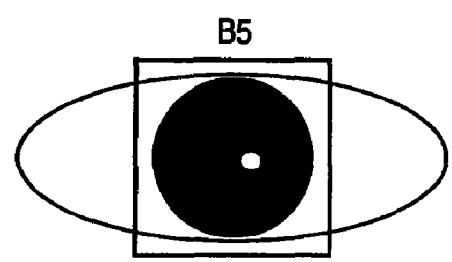
Figure 5C:
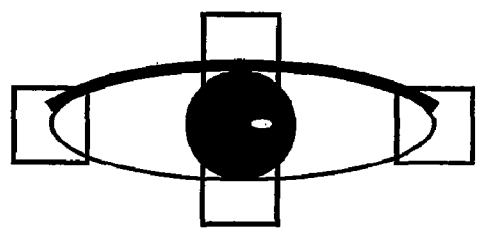
Figure 5D:
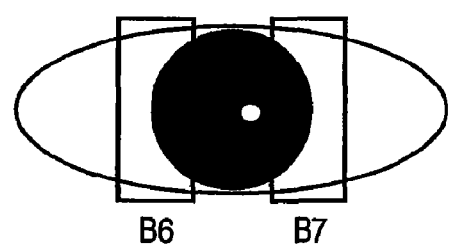
Figure 6:
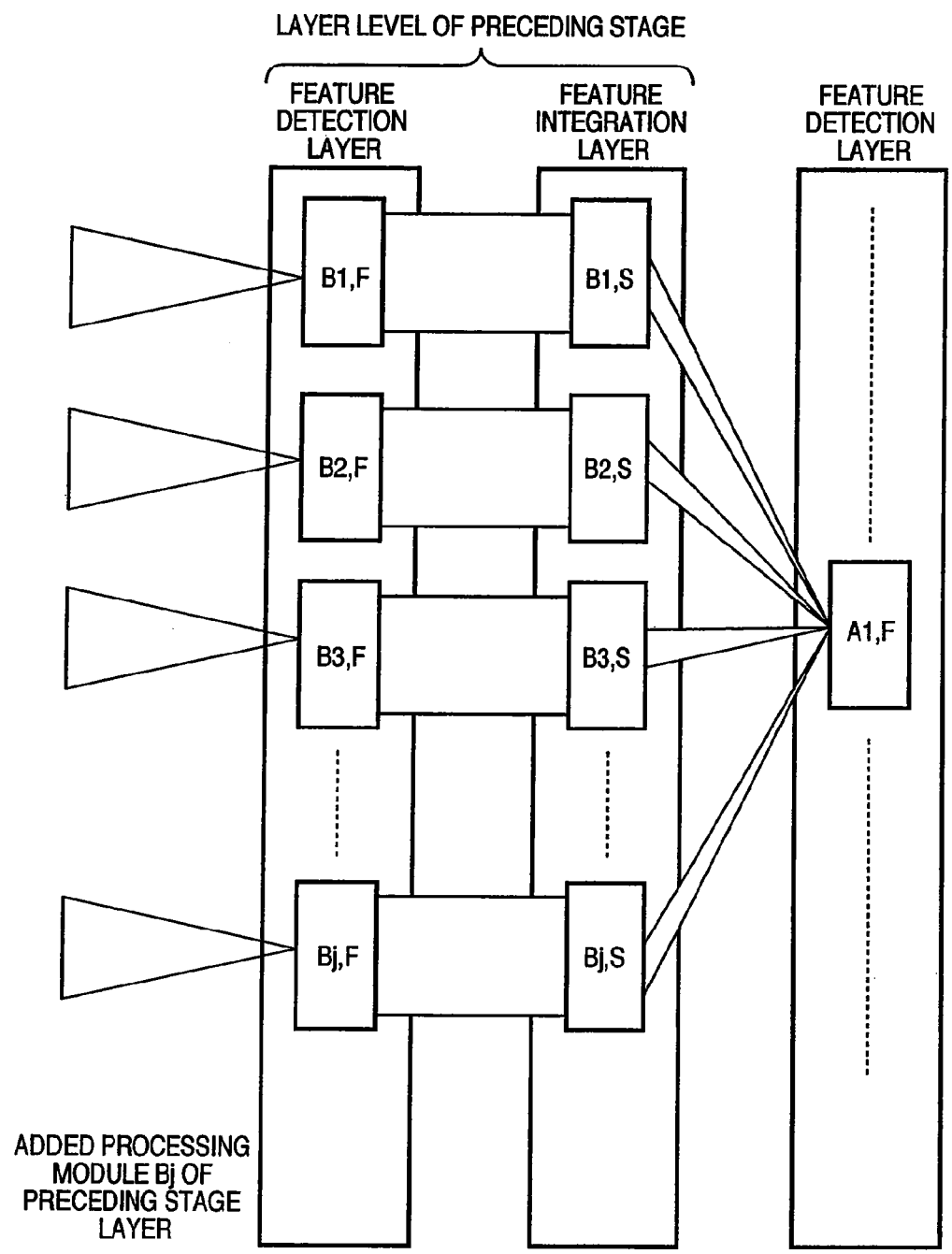
FIG. 6 is a schematic view for explaining the arrangement of the network processing circuit according to the first embodiment of the present invention.

To describe the operation of the processing module addition/deletion control circuit 30, the process of learning operation in the processing module in the feature detection layer which detects a block of a significant partial region (e.g., an eye, nose, or mouth in a face image) in an image will be described. A feature detection processing module ($A_1$) to detect an eye will be described. As shown in FIG. 5A, processing modules to detect local features (e.g., patterns in frames B1 to B4 in FIG. 5A) which are estimated as effective in detecting a partial region (supervisory data: eye) are present in the feature detection layer and feature integration layer under a processing module $A_{1,F}$ in advance, as shown in FIG. 6. The partial region (eye as a composite local feature) is detected by receiving only the outputs from the processing modules ($B_{1,S}$, $B_{2,S}$, $B_{3,S}$) present in the lower feature integration layer. Referring to FIG. 6, the processing modules ($B_{1,S}$, $B_{2,S}$, $B_{3,S}$) indicate processing modules arranged in the feature detection layer.

Assume that in the learning process of a local feature detection processing module $A_{1,F}$, the error amount for a training data set is larger than a predetermined threshold value because of detection error, and it is determined that the composite local feature detection performance of the processing module $A_{1,F}$ is insufficient. At this time, the processing module addition/deletion control circuit 30 automatically adds at least one processing module (e.g., $B_{j,F}$, and $B_{j,S}$ in FIG. 6) for the feature class in the lower feature detection layer. This processing module addition processing is executed in step S106.

Each neuron element of the added processing module forms a connection (to be described later) to each neuron element of the upper processing module ($A_1$). This addition can be implemented by changing the value of the connection coefficient from 0 (no connection state). Similarly, a module can be deleted by changing the value of the connection coefficient to 0.

When the error amount (or error value change rate) is equal to or smaller than the threshold value, relative evaluation of the degree of contribution for the feature detection performance in the processing module $A_{1,F}$ between the processing modules ($B_{1,S}$, $B_{2,S}$, . . . ) of the feature integration layer is done on the basis of the maximum value of the synapse weight value in the processing module. The processing module addition/deletion control circuit 30 deletes a processing module whose degree of contribution or the relative value of the degree of contribution (the relative value is given by setting the maximum degree of contribution of all processing modules belonging to the same layer level to 1) is equal to or smaller than a threshold value (e.g., 0.1). This processing module deletion processing is executed in step S108.

The index of the degree of contribution is given by the maximum value of the interneuron connection weight from a lower processing module to an upper processing module or the maximum value of the activity level of the neuron in each processing module when a pattern of a correct solution is presented.

At this time, the learning control circuit 40 presents (inputs) the data of the partial region (e.g., a local region including only an eye) as the supervisory data to the data input layer of the network processing circuit 10 and corresponding supervisor signal data to the processing module ($A_{1,F}$ in FIG. 6) of the feature detection layer. Supervised learning of the processing module ($A_{1,F}$ in FIG. 6) to detect the composite local feature (e.g., local feature representing an eye) mainly included in the partial region is executed by back propagation learning. More specifically, when the neuron output range is 0 to 1, supervisor signals for a correct pattern (pattern mainly containing the local feature to be detected) and incorrect pattern (pattern which does not contain the local feature to be detected) are given as 1 and 0, respectively, and learning is executed.

After learning converges (the criterion of convergence is that the mean value of errors is equal to or smaller than a predetermined threshold value), the learning control circuit 40 copies the receptor field structure (i.e., synapse connection weight data) of the neuron to give the minimum error in the module, which has undergone the learning, to the remaining neurons in the same module and consequently determines the shared receptor field structure in the new processing module.

The updating formula related to a synapse connection used in the learning process is given by $$w_{ji}^{l}(n+1)=w_{ji}^{l}(n)+\alpha[w_{ji}^{l}(n-1)]+\eta_{ji}\delta_{j}^{(l)}(n)y_{i}^{(l-1)}(n) \quad (1)$$

where $w^{(l)}_{ji}(n)$ is the synapse connection weight value from the ith neuron of the (l−1)th layer to the jth neuron of the lth layer in weight updating of nth time, $\alpha$ is the coefficient of inertia of learning, and $\eta_{ji}$ is the learning coefficient of connection from the ith neuron to the jth neuron. In addition, $\delta$ represents the local gradient. In an output layer L, $\delta$ is given by $$\delta_j^{(l)}(n) = e_j^{(L)}(n)\phi'_j(v_j^{(L)}(n)) \quad (2)$$

by using a differential coefficient $\phi'$ related to a neuron internal state v (corresponding to the result of the sum of the products of the neuron output of the preceding layer) of an activation function $\phi$ (typically, a logistic function is used) and an error value between the output signal and the supervisor signal. In the intermediate layer (lth layer), $\delta$ is given by $$\delta_j^{(l)}(n) = \varphi'_j(v_j^{(l)}(n))\sum_k \delta_k^{(l+1)}(n)w_{kj}^{(l+1)}(n) \quad (3)$$

The learning coefficient related to the connection weight between a lower processing module ($B_{k,F}$) of the feature detection layer, which has already finished learning, and the lower module of the processing module is set to be lower (e.g., 1/10 or less) than that of the newly added processing modules ($B_{j,F}$, $B_{j,S}$). The purpose of it is to prevent the characteristic of the module which has finished learning from being broken by relearning and suppress updating of the connection weight. For the newly added processing module, the error signal is extended relative to the module which has finished learning so that updating of the connection weight is promoted.

As described above, after the processing modules are added, the learning efficiency coefficient is set low in a module which has finished learning and high in a newly added module. In this state, supervised learning is executed by giving various supervisory data. For example, if the processing module $A_1$ which is doing learning is a module to detect an eye, data corresponding to an eye and various kinds of pattern data except data which is erroneously detected as an eye in the preceding learning phase are given as correct solution data and incorrect solution data, respectively.

As a result, when the upper processing module $A_{1,F}$ executes supervised learning, connection weights between the lower processing modules $B_1, B_2, \ldots$ (the index S of the feature detection layer and the index S of the feature integration layer will be omitted hereinafter) to directly output signal to the processing module $A_{1,F}$ and their lower modules (e.g., C1, C2, . . . ) are updated. However, when the processing module $A_1$ executes learning, the connection between the operation element of a processing module lower than the processing module $A_1$ by two or more layer levels and the operation element of the processing module of a further lower layer level is fixed (no change by learning occurs).

The receptor field size of the neuron of each added processing module may be set to be equal between the processing modules or vary within a predetermined range. Even when the number of processing modules to be added is one, learning may be executed while changing the receptor field size in a predetermined range, and a receptor field size to give a minimum error may be selected and used in the processing module $A_1$.

Initial setting of connections in adding a processing module is executed such that the connection between the neuron in the added processing module ($B_1$) and the neuron in the processing module $A_1$ and the connection between the neuron in the processing module ($B_j$) which has finished learning and the neuron in the processing module $A_1$ have different spatial layout relationships. For example, each neuron position (position of $n_a$ in the receptor field) in the processing module ($B_j$) connected to a given neuron ($n_a$) in the processing module $A_1$ is initially set to be different from the position in the $n_a$ receptor field of the neuron which is present in the processing module which has finished learning and connected to $n_a$. In the following description, the representative positions of the processing modules $B_1, B_2, \ldots$ are defined in the receptor field of the processing module $A_1$. The representative points of the processing modules $B_1, B_2, \ldots$ are, e.g., the central points of the local regions ($B_1, B_2, \ldots$) in FIGS. 5A to 5D.

With this arrangement, such learning is promoted that a new feature class different from that handled by a processing module which has finished learning is detected in the added processing module. "New feature class" indicates that the distance in the feature space from the learned feature category is larger than a predetermined reference value, or the similarity to the learned feature category is smaller than a predetermined reference value.

As a result of supervised learning in the processing module $A_1$, the receptor field structure of the neuron to give the minimum error value in the newly added processing module ($B_j$) generally corresponds to an unlearned local feature class contained in the pattern to be detected by the processing module $A_1$ because the representative position of the added processing module is different from all the representative positions of the remaining processing modules which have finished learning. This receptor field structure corresponds to detection of a new and useful local feature class as a local feature contained in the composite local feature to be detected by the processing module $A_1$.

In this way, the receptor field structure related to detection of an unlearned feature class as the constituent element of the composite local feature is automatically formed by learning. When the receptor field structure is copied to the receptor field (synapse connection weight data) of each neuron in the same processing module, the newly added processing module ($B_j$) is formed.

This will be described in more detail. For example, assume that when the processing module $A_1$ to detect an eye in a face is present, the processing modules $B_1$ and $B_2$ to detect patterns "<" and ">" corresponding to the lateral and medial angles of the eye as (effective) local features suitable for detecting the feature class "eye" are present. Instead, the modules may detect other features, and for example, the ends (left and right edges) of a line segment (or a long region) as local features. Generally, it is difficult to detect an eye on the basis of only these local features. In many case, a pattern other than an eye is erroneously detected.

When the error is not equal to or smaller than a threshold value with respect to a training data set containing a pattern except an eye, the processing module addition/deletion control circuit 30 receives a control signal from the learning control circuit 40 and newly adds the processing modules $B_3$ to the feature detection layer and feature integration layer. Processing modules may be added for a plurality of classes. The receptor field size of each neuron n the processing module $B_3$ is almost the same as that of existing the processing modules or smaller than the "eye" pattern to be detected. The receptor field size need not always be the same as that of the existing processing modules.

In supervised learning (back propagation learning) executed next, the learning coefficient related to connection from the modules $B_1$ and $B_2$ which have finished learning is set to be small (e.g., $\frac{1}{10}$ that in learning for the modules $B_1$ and $B_2$). The added processing module $B_3$ detects a local feature of a new class which is not detected by the existing processing modules.

Even a composite local feature which contains local features $F_1$ and $F_2$ detected by the processing modules $B_1$ and $B_2$ and has the same spatial layout relationship as that of the eye pattern can be recognized as a pattern except an eye. The supervisor signal in the processing module $A_1$ for such a pattern is given as a supervisor signal of an incorrect solution (0 when the output nonlinear function of the neuron is a logistic function). When the supervisor signal for a local feature mainly containing the eye pattern is given as a correct solution (1 when the output nonlinear function of the neuron is a logistic function), a feature detector which has a size corresponding to the receptor field size of the neuron of the processing module $B_3$ and detects a feature except the local features $F_1$ and $F_2$ is generated.

The local feature detected by each neuron of the processing module $B_3$ is one of composite local features formed by using the local features (to be referred to as low-order local features) detected at the preceding layer level of the processing module $B_3$. Examples of the low-order local features are a line segment having a predetermined direction component and size and a blob.

Examples of candidates of the new feature category to be detected by the processing module $B_3$ by learning are the iris portion of the eye or part of the contour (or whole contour) of it. The type of local feature to be newly detected by the processing module $B_3$ by learning in the processing module $A_1$ also depends on the receptor field size of each neuron and the receptor field structure in the initial state before learning (initial value distribution of synapse weight values).

A synapse circuit is associated with an interlayer connection (connection between a neuron on a feature detection layer and a neuron on a feature integration layer; each layer can have a connection to the subsequent layer and a connection to the preceding layer).

In this embodiment, each neuron element n, outputs a pulse signal (spike train). As the neuron element, a so-called integrate-and-fire neuron element (to be described later) is used. However, an element which outputs a signal except a pulse may be used.

<Operation Principle of Pattern Detection by Time Window Integration of Pulse Signal>

Pulse coding and a detection method of a two-dimensional graphic pattern will be described next. FIG. 4A is a view schematically showing pulse signal propagation from a feature integration layer to a feature detection layer (e.g., from the layer (2,0) to the layer (1,1) in FIG. 1).

Neurons $n_i$ on the feature integration layer side correspond to different feature amounts (or feature elements). The neuron $n'_j$ on the feature detection layer side is involved in detection of a higher-order feature (graphic element) obtained by combining the features in the same receptor field.

A pulse modulation element which executes modulation corresponding to the connection weight value for an input signal is used as each interneuron connection (synapse connection). For, e.g., phase modulation, a delay unique (unique to the feature) is generated due to the pulse propagation time and the time delay at the synapse connection ($S_{j,i}$) from the neuron $n_i$ to the neuron $n'_j$. A pulse train $P_i$ which consequently arrives at the neuron $n'_j$ has a predetermined order (and interval) due to the delay amount at the synapse connection determined by learning as long as a pulse is output from each neuron in the feature integration layer (pulses arrive in an order of $P_4$, $P_3$, $P_2$, and $P_1$ in FIG. 4A).

Application Example

FIG. 8 is a block diagram showing the schematic arrangement of a pattern recognition apparatus by parallel pulse signal processing, which includes the above-described arrangements as basic elements, and an image input apparatus (e.g., camera, video camera, or scanner) including the pattern recognition apparatus.

An image sensing apparatus 9 shown in FIG. 8 comprises an imaging optical system 92 which includes a photographing lens and a driving control mechanism for zoom photography, a CCD or CMOS image sensor 93, an image sensing parameter measuring unit 94, a video signal processing circuit 95, a storage unit 96, a control signal generation unit 97 which generates a control signal to control the image sensing operation or image sensing conditions, a display 98 also serving as a viewfinder such as EVF, an electronic flash unit 99, a recording medium 910, and a subject recognition unit 911 (pattern recognition apparatus including a parallel pulse signal processing circuit having the above-described hierarchical structure).

In this image sensing apparatus 9, the subject recognition unit 911 detects, e.g., the face image (detects the presence position and size) of a person who is registered in advance from a sensed video image. The pieces of information of the position and size of the person are input to the control signal generation unit 97. The control signal generation unit 97 generates control signals to optimally control focusing, exposure condition, and white balance for the person on the basis of the output from the image sensing parameter measuring unit 94.

When the pattern detection (recognition) apparatus is used in the image sensing apparatus, the function of properly detecting (recognizing) the subject can be implemented at low power consumption and high speed (real time). Hence, detection of a person or the like and optimum control (AF or AE) of photography based on it can be done.

As described above, this embodiment is robust to noise or variations in the recognition target pattern and can implement a generalization function and new category learning function.

A small number of local feature classes effective for recognition, which include both relatively simple feature classes and feature classes complex to some degree, can efficiently be learned while excluding overlapping in a predetermined feature space. By using the local feature classes, arbitrary pattern recognition can efficiently be executed.

Especially, in a neural network or hierarchical parallel processing, by using an effective feature class detection element which has finished learning and at least one feature detection element which has not finished learning yet (which will execute learning), a connection structure (receptor field structure) between operation elements to detect a new feature class effective for recognizing/detecting a predetermined pattern can efficiently be formed by learning on the basis of outputs from the detection elements.

Second Embodiment

Figure 9:
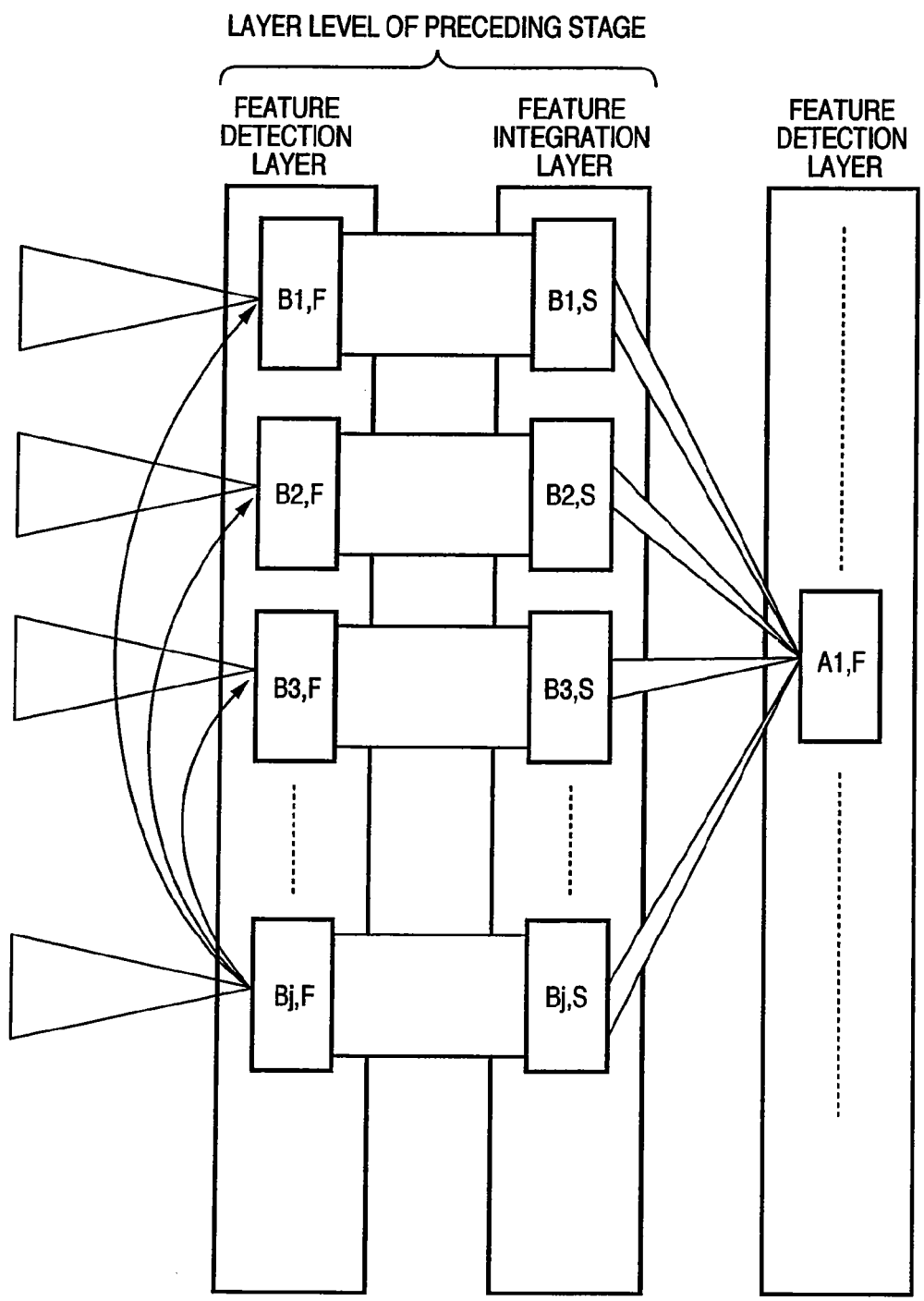
FIG. 9 is a schematic view for explaining the arrangement of a network processing circuit according to the second embodiment of the present invention.

In this embodiment, an intralayer connection between neurons is introduced between existing processing modules and newly added processing modules in a feature integration layer, as shown in FIG. 9. FIG. 9 is a schematic view for explaining the arrangement of a network processing circuit according to this embodiment.

As in the first embodiment, after supervised learning converges, when the error mean value of neuron outputs is more than the threshold value, processing is executed after addition of processing modules. After that, self-organizing learning to be described later is executed by a learning control circuit 40. The self-organizing learning promotes detection of a feature class which is present independently of a feature class to be detected by processing modules which have finished learning.

Figure 10:
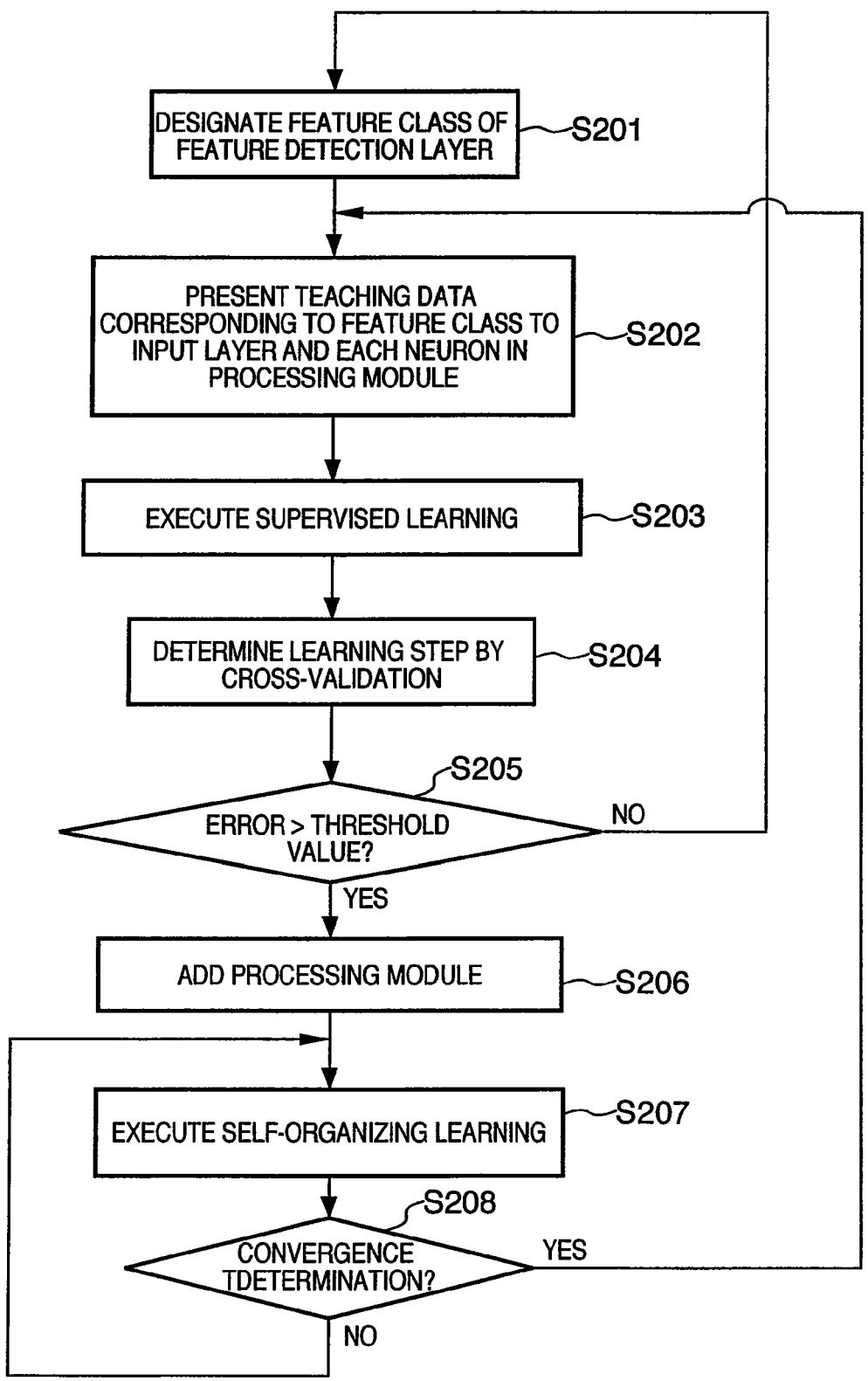
FIG. 10 is a flowchart of learning control processing by a learning control circuit 40.

FIG. 10 is a flowchart of learning control processing by the learning control circuit 40.

As in the first embodiment, the learning control circuit 40 designates each processing module (feature class) of feature detection layers ((1,1), (1,2), ... ) (step S201). Supervisory data is read out from a supervisory data holding memory 20. Training input data is presented (input) to each neuron of the input layer. Training supervisory data is presented (input) to a predetermined neuron in the processing module designated in step S101 (step S202). Supervised learning (e.g., back propagation learning) is executed (step S203).

As in the first embodiment, the learning control circuit 40 monitors the learning process. When learning progresses to some extent, the learning control circuit 40 executes error determination (step S204) by so-called cross-validation and comparison with the threshold value of a learning error (to be described later) (step S205). If the minimum error value in the same processing module is larger than a predetermined threshold value, and the error change rate (e.g., difference to the preceding learning error) is less than a predetermined reference value, the learning control circuit 40 inputs a control signal to a processing module addition/deletion control circuit 30 to add a processing module in the lower feature detection layer and feature integration layer (step S206). At this time, a connection (interlayer connection) is initially set from each operation element of the added processing module to each operation element of the remaining processing modules which have finished learning in the same layer.

The receptor field size of the initially set connection is a predetermined value determined in accordance with the degree of complexity of the feature class (for example, when the receptor field size of a face detection processing module is 1, the receptor field sizes of an eye detection processing module and lateral and medial angles detection processing modules are given as representative values of certain groups related to the eye and mouth sizes with respect to the face size). The connection weight value is given at random within the range of −1 to 1. Learning executed after processing module addition is self-organizing learning (step S207) unique to this embodiment. The self-organizing learning processing in step S207 will be described later in detail.

Convergence determination and error determination as in the first embodiment are done (step S208). If the error is equal to or smaller than the threshold value, the next feature class is designated, and the same learning process (i.e., processing in steps S201 to S208) is executed. The same learning process is repeated for all feature classes in the feature detection layer.

The self-organizing learning in step S207 will be described next in detail.

In the self-organizing learning, image data (e.g., data which contains only eye image data as a feature category and whose background is solid image data) mainly containing the feature category (e.g., eye) to be detected by the processing module designated in step S201 is presented (input) to the data input layer.

In this embodiment, each neuron is a linear element (e.g., element which outputs a linear sum of signals from the preceding layer). Self organization based the so-called anti-Hebbian rule is executed for intralayer connection learning. Self organization based the so-called Hebbian rule is executed for interlayer connection learning. More specifically, let w be the weight vector of an interlayer connection, and A be the intralayer connection. The updating formulas of the weight vectors in the jth neuron of the kth layer are given by $$w_j^k(n+1) = w_j^k(n) + \eta(y_j^k(n)y^{k-1} - y_j^2(n)w_j^k(n))$$

$$A_j^k(n+1) = A_j^k(n) - \eta(y_j^k(n)y_{j-1}^k - y_j^2(n)A_j^k(n)) \quad (4)$$

where $y_j^k = [y_1^k, y_2^k, \ldots y_{j-1}^k]$, $y^k = [y_1^k, y_2^k, \ldots y_k^k]$, k is the layer number index, and N(k) is the total number of neurons of the kth layer.

Input data (e.g., input data shown in FIGS. 5A to 5D) containing a feature with almost the same size as that of the feature category to be detected by a neuron of a feature detection layer higher by one level than the layer to which the processing module is added is used, and predetermined supervisory data is presented to the input layer. As supervisory data for self organization, for example, when a processing module is added to each of the feature detection layer and feature integration layer of the preceding stage of a feature detection layer which detects an eye, image data containing only an eye is given as supervisory data. Similarly, when a processing module is added to each of the feature detection layer and feature integration layer of the preceding stage of a feature detection layer which detects a face, image data containing only a face is given to the input data as supervisory data.

As in the first embodiment, a plurality of processing modules may be added for one layer. For the receptor field structure of each operation element (neuron) of the added processing module, the size is constant in the processing module, and the connection weight is set at random in the initial state. The receptor field size is determined in advance in accordance with the feature class (degree of complexity of the feature) to be detected. When a plurality of processing modules are added, the receptor field size may be changed to some extent between the modules.

The above-described self organization is a competitive learning process which reduces the correlation between the output from the added module and the output from the module which has finished learning. As another self organization method, learning to minimize the mutual information amount between the processing modules may be executed. The self-organizing learning process stops when the correlation or mutual information amount between the modules becomes equal to or less than the threshold value.

When the self organization given by the above updating formula converges, an intralayer connection A converges to a zero vector. An interlayer connection $w^k$ converges to an eigenvector corresponding to the kth largest eigenvalue related to output data from a local region (receptor field of the neuron in the added processing module) from the layer of the preceding stage. The variance of the neuron outputs of the processing module has the kth largest eigenvalue. The eigenvectors are perpendicular to each other.

The processing module added by the above-described self-organizing learning detects a feature class perpendicular to the remaining learned feature classes in the feature space, i.e., a new feature class which is not detected by any other processing modules which have finished learning in the same layer.

The feature detected by each processing module formed according to this embodiment can be interpreted as a projective component to each axis of a feature space formed by eigenvectors related to the covariance matrix of the input data set in a lower layer level to which the data of the input layer is directly input, or a feature space formed by eigenvectors related to the covariance matrix of feature data extracted in the layer level of the preceding stage in a higher intermediate layer.

In the upper feature detection layer processing module to which the added processing module and processing modules which have finished learning (feature integration layer) are connected, learning of the intralayer connection to the added processing module is executed as supervised learning such as normal back propagation learning as in the first embodiment. Connection between each processing module in the same layer as the added processing module and each processing module of the lower layer is fixed.

According to the method of this embodiment, a feature (feature which is locally detected) class as the constituent element useful for subject recognition of a new category can automatically efficiently be learned.

Third Embodiment

Still another embodiment will be described, in which a neural circuit module to automatically detect a local feature as an alphabetical graphic element from various supervisory sample images is formed in a convolutional network structure, as in the first and second embodiments. As the network structure, another hierarchical parallel processing architecture may be used.

Figure 13:
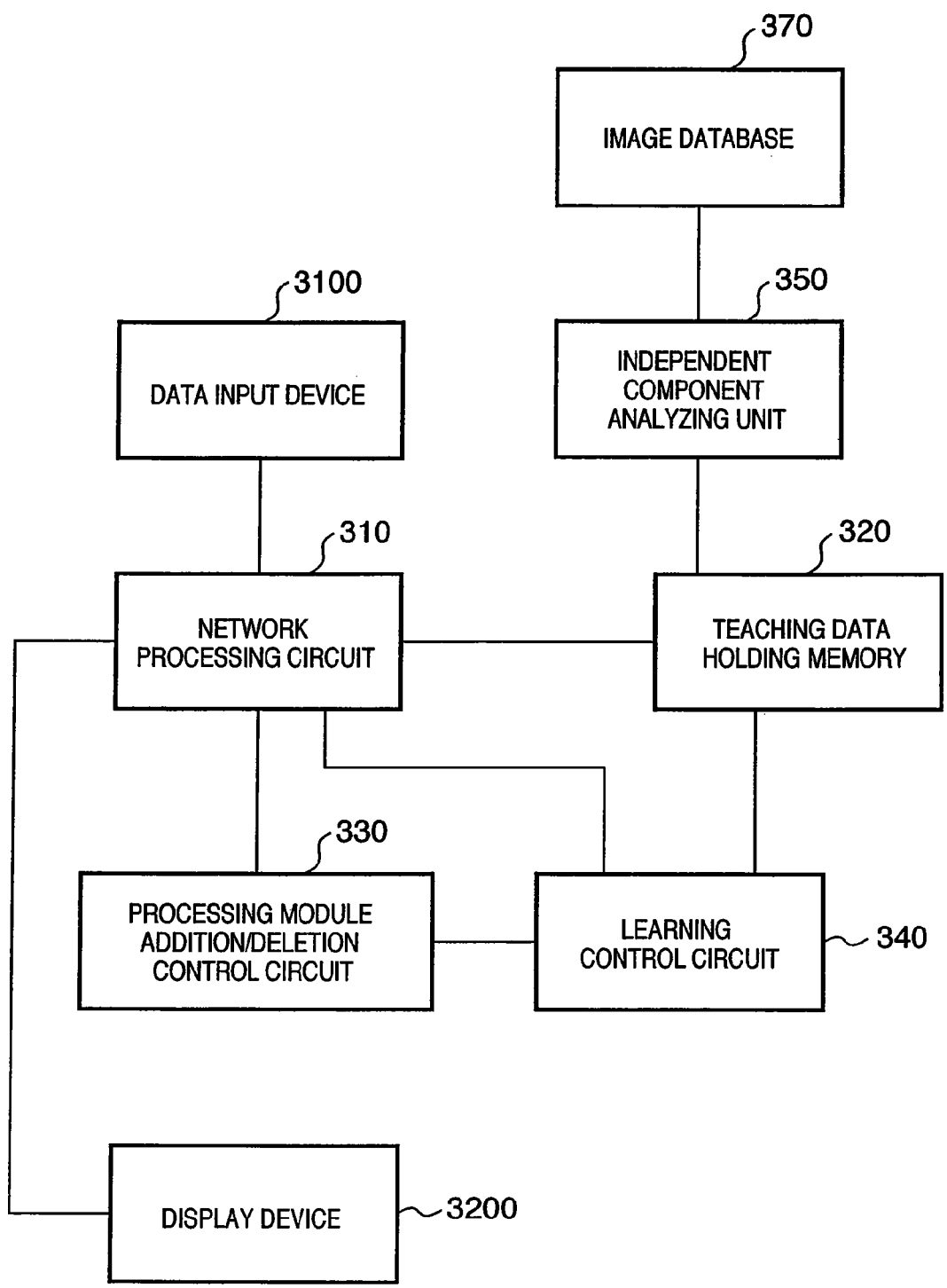
FIG. 13 is a block diagram showing the functional arrangement of an apparatus (pattern recognition apparatus) which executes pattern recognition processing according to the third embodiment of the present invention.
Figure 14A:
FIG. 14A-14D are views schematically showing an example of a base image obtained by executing independent component analysis for different eye image data sets.
Figure 14B:
Figure 14C:
Figure 14D:
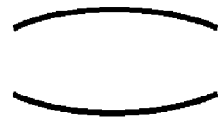

In this embodiment, it is understood that a feature to be detected by a processing module is mainly contained in image data corresponding to a prominent region in a base image obtained by independent component analysis. A pattern recognition apparatus according to this embodiment includes a data input device 3100, network processing circuit 310, independent component analyzing unit 350, image database 370, supervisory data holding memory 320, processing module addition/deletion control circuit 330, learning control circuit 340, and display device 3200, as shown in FIG. 13.

Figure 11:
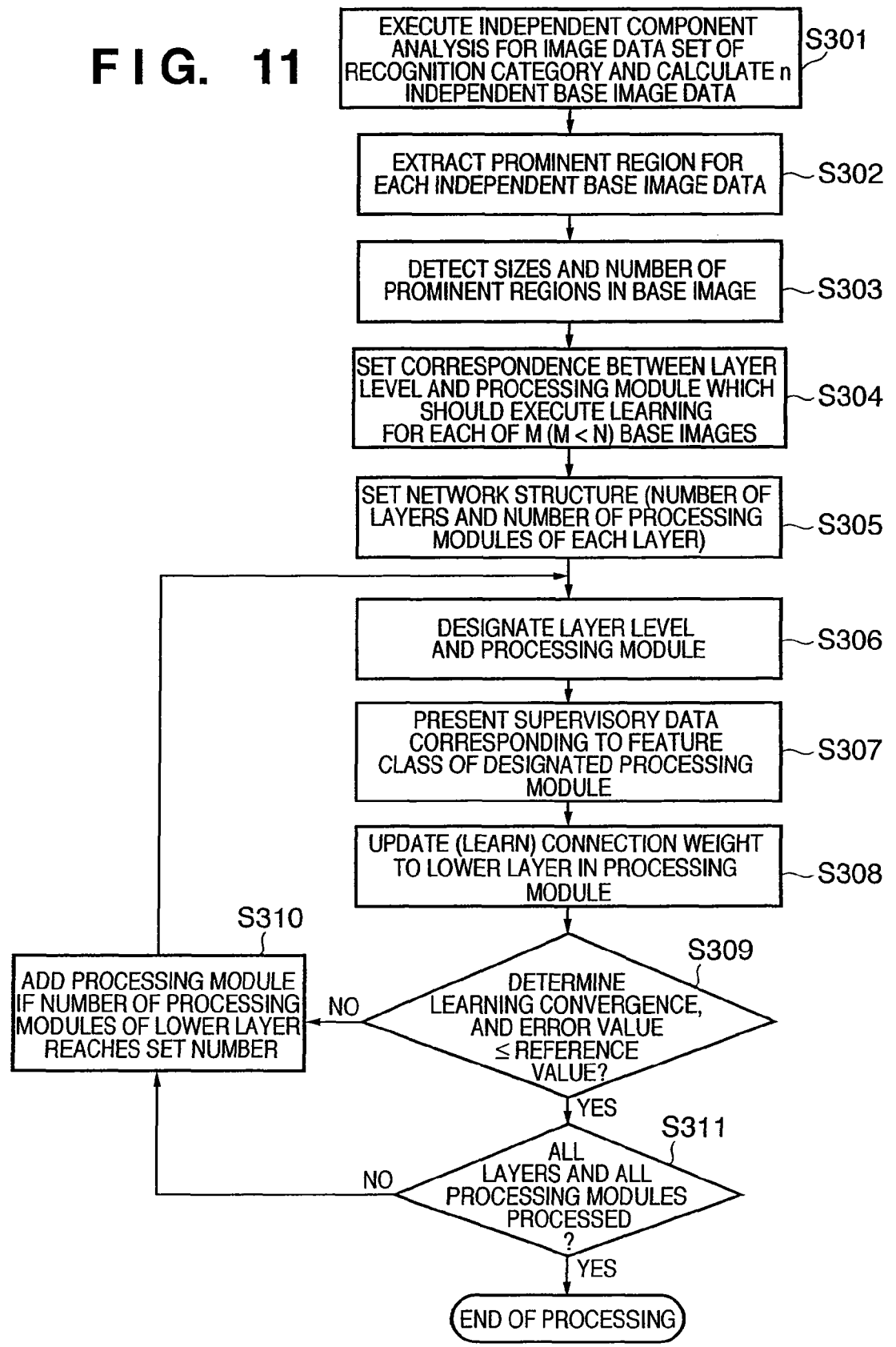
FIG. 11 is a flowchart of learning processing executed by a pattern recognition apparatus according to the third embodiment of the present invention.

Learning processing executed by the pattern recognition apparatus according to this embodiment will be described below in detail with reference to FIG. 11. First, a plurality of recognition target image data sets (e.g., face image data sets of different persons having predetermined direction and size) are input from the image database 370. The independent component analyzing unit 350 executes independent component analysis for the data sets to obtain n independent base image data sets (step S301).

FIGS. 12A to 12F schematically show examples of base images obtained by executing independent component analysis for the face image data sets of different persons. FIGS. 14A to 14D schematically show examples of base images obtained by executing independent component analysis for different eye image data sets.

When a feature class (e.g., eye) to be detected by a layer level halfway in the convolutional network structure is known, base images (e.g., FIGS. 14A to 14D) obtained by presenting image data sets corresponding to the feature class of the intermediate level and executing independent component analysis may be obtained.

Figure 12A:
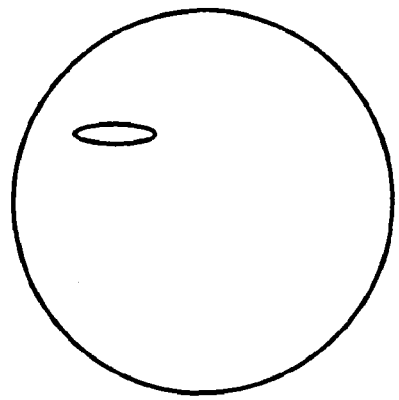
FIG. 12A-12F are views schematically showing an example of a base image obtained by executing independent component analysis for the face image data sets of different persons.
Figure 12B:
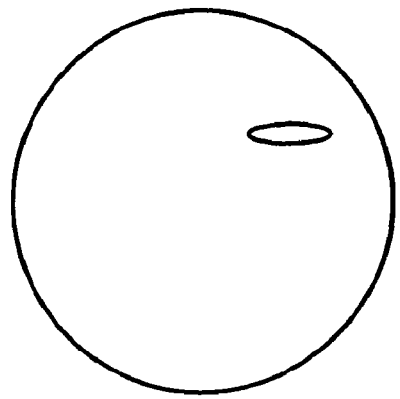
Figure 12C:
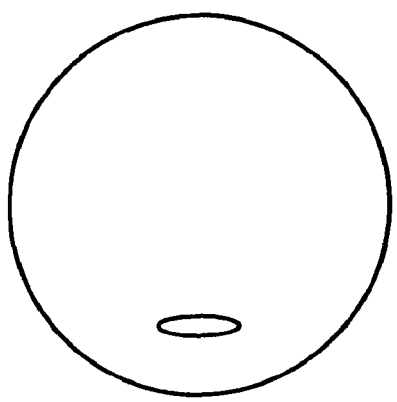
Figure 12D:
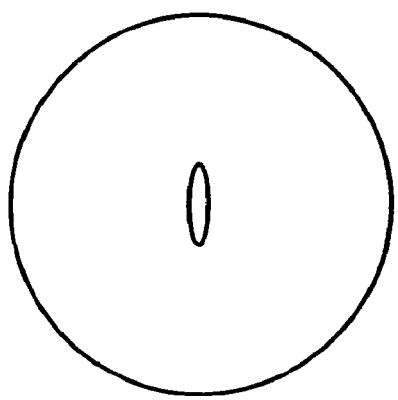
Figure 12E:
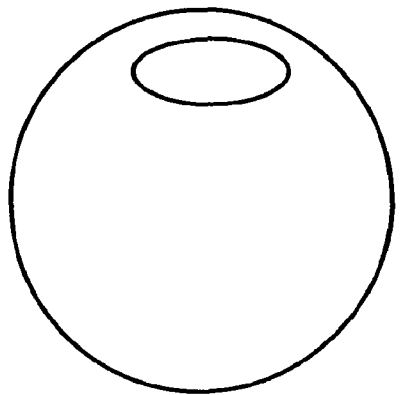
Figure 12F:
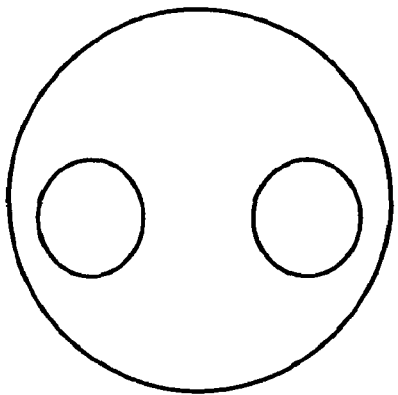

In layer level 1, an independent base number n is defined as shown in, e.g., FIG. 12D by initial setting. A prominent local region (to be referred to as a prominent region hereinafter) is obtained for each base image (step S302). The prominent region is, e.g., a connection region including a region in which the absolute value of the spatial differential value is equal to or larger than a predetermined threshold value. A plurality of prominent regions may be present in one independent base image, as shown in FIG. 12F. In this case, the regions are used for learning in a feature detection layer of a higher layer level. As the connection region, a region having a predetermined shape such as a rectangle or ellipse may be used.

The numbers and sizes of the prominent regions are obtained for the respective base images (step S303). The correspondence between the layer level and the processing module in the layer is set for each base image (step S304). For example, when the number of prominent regions is 1, the layer level is set to 1. When the number of prominent regions is L, the layer level is set to L. Assume that one feature detection layer and one feature integration layer are present in each layer level. In initial setting, processing modules in number (m: m<n) smaller than the calculated number of independent base image data are prepared as a whole.

Initial setting of the network structure (the number of layer levels, the number of processing modules of each layer, and the connection weight pattern of each processing module) is done (step S305). The layer level and processing module are designated from the lowermost layer (step S306). Supervisory data is presented to the input layer and processing module (step S307). Learning (supervised learning is executed basically, though self-organizing learning as in the second embodiment may be performed) is executed for each processing module (step S308).

More specifically, the image data of the local region in input data corresponding to each prominent region is held in the supervisory data holding memory 320 as supervisory input data. At the time of learning, each supervisory input data is presented to the input layer (step S307). Supervised learning as in the first embodiment is executed in each processing module of the feature detection layer with a layer number corresponding to the number of connection regions in the independent base image (step S308).

Learning convergence is determined, as in the above embodiments. The error value is evaluated and compared with a preset reference value (step S309). If the error value is equal to or smaller than the reference value, the flow advances to a determination step (step S311). If it is determined that learning has been executed in all layers and all processing modules, the series of learning processes is ended.

If it is determined by determination processing in step S309 that the error value is larger than the reference value, the processing module addition/deletion control circuit 30 adds a new processing module when all the processing modules in the initial setting have already finished learning in layers lower than the processing module (step S310). Initial setting of the connection between each operation element of the added processing module and the operation elements of the lower layer is the same as in the first embodiment.

Fourth Embodiment

In the above embodiments, the pattern recognition apparatus is implemented by dedicated hardware. Instead, the above-described processing executed by the pattern recognition apparatus may be prepared in the form of a program, installed in the memory of a computer such as PC (personal computer) or WS (workstation), and executed by the CPU of the computer so that the computer can execute the processing executed by the pattern recognition apparatus described in the above embodiments.

Other Embodiment

The object of the present invention is achieved even by supplying a recording medium (or storage medium) which records the program codes of software to implement the functions of the above-described embodiments to a system or apparatus and causing the computer (or CPU or MPU) of the system or apparatus to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the recording medium are written in the memory of a function expansion board inserted into the computer or a function expansion unit connected to the computer, and the CPU of the function expansion board or function expansion unit performs part or all of actual processing on the basis of the instructions of the program codes.

When the present invention is applied to the recording medium, program codes corresponding to the above-described flowcharts (functional arrangements) are stored in the recording medium.

As many apparently widely different embodiments of the present invention can be made without departing from the spirit and scope thereof, it is to be understood that the invention is not limited to the specific embodiments thereof except as defined in the claims.

CLAIM OF PRIORITY

This application claims priority from Japanese Patent Application No. 2004-174601 filed on Jun. 11, 2004, which is hereby incorporated by reference herein.

What is claimed is:

1. An information processing apparatus which includes a data input layer, an arithmetic processing layer having at least one layer level and a plurality of processing modules corresponding to feature classes to be detected, a learning control circuit, and a processing module addition/deletion control circuit, said apparatus comprising:
   determination means for determining whether an error signal of an operation element output at a predetermined layer level in the arithmetic processing layer satisfies a predetermined condition in a predetermined learning step executed by the learning control circuit; and
   control means for, when said determination means determines that the predetermined condition is satisfied, executing control to cause the processing module addition/deletion control circuit to add at least one processing module in a layer of a level lower than the layer level.

2. The apparatus according to claim 1, wherein in the predetermined learning step, the learning control circuit sets a local initial connection between an operation element in the processing module added in the predetermined layer and an operation element in a predetermined processing module of a level lower than the layer, and the initial connection is formed with respect to an operation element of the lower layer which has a spatial layout different from a spatial layout of each operation element in the predetermined processing module of the lower layer to which the operation element in said processing module which has finished learning in the predetermined layer is connected.

3. The apparatus according to claim 1, wherein said control means causes the processing module addition/deletion control circuit to execute processing of adding a plurality of processing modules simultaneously, and a receptor field size of an operation element of the added processing module changes between the added processing modules.

4. The apparatus according to claim 1, wherein the processing module addition/deletion control circuit evaluates a relative degree of contribution of each processing module of a predetermined layer level in the arithmetic processing layer and deletes a processing module whose relative degree of contribution is smaller than a predetermined threshold value.

5. A pattern recognition apparatus comprising:
   a data input layer;
   an arithmetic processing layer which has at least one layer level and a plurality of processing modules corresponding to a plurality of feature classes to be detected;
   a learning control circuit;
   a processing module addition/deletion control circuit; and
   recognition result output means for outputting a predetermined pattern recognition result on the basis of an output from said arithmetic processing layer,
   wherein when an error signal of an operation element output at a predetermined layer level in said arithmetic processing layer satisfies a predetermined condition in a predetermined learning step executed by said learning control circuit, said processing module addition/deletion control circuit adds at least one processing module in a layer of a level lower than the layer level.

6. An information processing method executed by an information processing apparatus which includes a data input layer, an arithmetic processing layer having at least one layer level and a plurality of processing modules corresponding to feature classes to be detected, a learning control circuit, and a processing module addition/deletion control circuit, said method comprising:
   a determination step of determining whether an error signal of an operation element output at a predetermined layer level in the arithmetic processing layer satisfies a predetermined condition in a predetermined learning step executed by the learning control circuit; and
   a control step of, when it is determined in the determination step that the predetermined condition is satisfied, executing control to cause the processing module addition/deletion control circuit to add at least one processing module in a layer of a level lower than the layer level.

7. A pattern recognition method executed by a pattern recognition apparatus including
   a data input layer,
   an arithmetic processing layer which has at least one layer level and a plurality of processing modules corresponding to a plurality of feature classes to be detected,
   a learning control circuit,
   a processing module addition/deletion control circuit, and
   recognition result output means for outputting a predetermined pattern recognition result on the basis of an output from the arithmetic processing layer, wherein when an error signal of an operation element output at a predetermined layer level in the arithmetic processing layer satisfies a predetermined condition in a predetermined learning step executed by the learning control circuit, the processing module addition/deletion control circuit adds at least one processing module in a layer of a level lower than the layer level.

8. An information processing apparatus which executes processing of correcting a connection constant between layers to set, as a desired output value, an output value from each neuron included in a predetermined processing module in a predetermined detection layer in a hierarchical neural network which is constituted by alternately arranging, between a data input layer and a data output layer, a detection layer which includes a plurality of processing modules to detect a feature amount to be detected from an output from a layer of a preceding stage and an integration layer which integrates and outputs outputs from the detection layer, said apparatus comprising:
   error calculation means for obtaining an error between the desired output value and the output value from each neuron included in the predetermined processing module in the predetermined detection layer;
   addition means for adding a new processing module in accordance with the error in at least one layer of the layers arranged between the data input layer and the layer which outputs the output value to the predetermined processing module; and
   correction means for, after addition processing by said addition means, correcting the connection constant between a predetermined number of layers from the predetermined detection layer to the data input layer on the basis of the error by said error calculation means.

9. An information processing method of executing processing of correcting a connection constant between layers to set, as a desired output value, an output value from each neuron included in a predetermined processing module in a predetermined detection layer in a hierarchical neural network which is constituted by alternately arranging, between a data input layer and a data output layer, a detection layer which includes a plurality of processing modules to detect a feature amount to be detected from an output from a layer of a preceding stage and an integration layer which integrates and outputs outputs from the detection layer, said method comprising:

an error calculation step of obtaining an error between the desired output value and the output value from each neuron included in the predetermined processing module in the predetermined detection layer;

an addition step of adding a new processing module in accordance with the error in at least one layer of the layers arranged between the data input layer and the layer which outputs the output value to the predetermined processing module; and a correction step of, after addition processing in the addition step, correcting the connection constant between a predetermined number of layers from the predetermined detection layer to the data input layer on the basis of the error in the error calculation step.

* * * * *